United States Patent
Aminaka

(10) Patent No.: US 8,706,132 B2
(45) Date of Patent: Apr. 22, 2014

(54) RADIO COMMUNICATION SYSTEM, BASE STATION, MOBILE STATION, CONTROL METHOD OF BASE STATION, CONTROL METHOD OF MOBILE STATION, AND STORAGE MEDIUM STORING PROGRAM

(75) Inventor: Hiroaki Aminaka, Tokyo (JP)

(73) Assignee: NEC Corporation, Tokyo (JP)

( * ) Notice: Subject to any disclaimer, the term of this patent is extended or adjusted under 35 U.S.C. 154(b) by 28 days.

(21) Appl. No.: 13/202,480

(22) PCT Filed: Feb. 8, 2010

(86) PCT No.: PCT/JP2010/000745
§ 371 (c)(1),
(2), (4) Date: Aug. 19, 2011

(87) PCT Pub. No.: WO2010/103725
PCT Pub. Date: Sep. 16, 2010

(65) Prior Publication Data
US 2011/0300856 A1 Dec. 8, 2011

(30) Foreign Application Priority Data

Mar. 13, 2009 (JP) ................ 2009-060559

(51) Int. Cl.
*H04W 72/00* (2009.01)
*H04B 17/00* (2006.01)
*H04B 7/00* (2006.01)
*H04W 4/00* (2009.01)

(52) U.S. Cl.
USPC ............. 455/452.2; 455/67.11; 455/67.13; 455/522; 370/331; 370/332; 370/328; 370/329

(58) Field of Classification Search
USPC ........ 455/452.2, 67.11, 67.13, 522; 370/331, 370/332, 328, 329
See application file for complete search history.

(56) References Cited

U.S. PATENT DOCUMENTS

2004/0156386 A1 8/2004 Atarashi et al.
2009/0325623 A1* 12/2009 Morita et al. ................ 455/522

FOREIGN PATENT DOCUMENTS

JP 2004-297756 A 10/2004
JP 2008-172355 A 7/2008

OTHER PUBLICATIONS

3GPP, TS25.211 v8.3.0, "Physical channels and mapping of transport channels onto physical channels," FDD, Release 8, Dec. 2008, pp. 1-56.

(Continued)

*Primary Examiner* — Kamran Afshar
*Assistant Examiner* — Omoniyi Obayanju
(74) *Attorney, Agent, or Firm* — Sughrue Mion, PLLC

(57) ABSTRACT

An object of the present invention is to provide a radio communication system capable of effectively coping with the two problems, which are in a trade-off relation between the deterioration of the use efficiency of the radio resources and the deterioration of the radio quality of the secondary cell, in the cases where both a combination of carrier frequency bands that are away from each other and a combination of carrier frequency bands that are adjacent to each other can be alternatively used as the combination of carrier frequency bands for a primary cell and a secondary cell. A radio communication system according to the present invention includes a mobile station (20), and a base station (10) configured to perform radio communication with the mobile station (20) by using first and second carrier frequency bands simultaneously for at least one of an uplink direction and a downlink direction. Further, the mobile station (20) and the base station (10) are configured to be able to switch whether or not to perform control relating to the second carrier frequency band by using a radio channel transmitted on the second carrier frequency band.

37 Claims, 20 Drawing Sheets

(56) References Cited

OTHER PUBLICATIONS

3GPP, TS25.212 v8.4.0, "Multiplexing and channel coding," FDD, Release 8, Dec. 2008, pp. 1-107.

3GPP, TS25.214 v8.4.0, "Physical layer procedures," FDD, Release 8, Dec. 2008, pp. 1-92.

3GPP, TS25.319 v8.4.0, "Enhanced uplink; Overall description; Stage 2," Release 8, Dec. 2008, pp. 1-65.

3GPP TSG-RAN Pleanry#43, RP-081123, Work Item Description, "Multi-carrier evolution," Dec. 2008, 5 pages total.

* cited by examiner

| Information Element/ Group name | Need | Multi | Type and reference | Semantics description |
|---|---|---|---|---|
| Secondary Cell info list | OP | 1 to <maxMultiCell-1> | | FDD only |
| >New H-RNTI | OP | | | |
| >Downlink 64QAM configured | OP | | Enumerated (TRUE) | Absence of this IE means that the secondary cell HS-SCCH does not use the 64QAM format. |
| >HS-DSCH TB size table | CV-Not64QAM | | Enumerated (octet aligned) | If this IE is present, octet aligned table is used, else bit aligned table is used. |
| >Primary CPICH info | MP | | Primary CPICH Info 10.3.6.60 | |
| >DL Scrambling Code | MD | | Secondary scrambling code 10.3.6.74 | DL Scrambling code to be applied for HS-DSCH and HS-SCCH. Default is same scrambling code as for the primary CPICH. |
| >Control mode indicator | OP | | Enumerated (Available, Not-available) | |
| > HS-SCCH Channelisation Code Information | MP | 1 to maxHSSCCHs > | | |
| >>HS-SCCH Channelisation Code | MP | | Integer (0..127) | |
| >Measurement Power Offset | MP | | Real (-6 .. 13 by step of 0.5) | The measurement power offset, Γ, in dB |
| >>UARFCN downlink (Nd) | OP | | Integer (0 .. 16383) | |

Fig. 17

| IE/Group Name | Presence | Range | IE Type and Reference | Semantics Description |
|---|---|---|---|---|
| HS-SCCH Power Offset | OP | | INTEGER (0...255) | Unit: dB<br>Range: -32 .. +31.75 dB<br>Step: 0.25 dB |
| Measurement Power Offset | MP | | INTEGER (-12..26) | Unit: dB<br>Range: -6..13dB<br>Step: 0.5dB |
| Sixtyfour QAM Usage Allowed Indicator | OP | | ENUMERATED (Allowed, Not-Allowed) | |
| HS-DSCH-RNTI | MP | | INTEGER (0..65535) | |
| Control mode indicator | OP | | Enumerated (Available, Not-available) | |

Fig. 18

| Information Element/ Group name | Need | Multi | Type and reference | Semantics description |
|---|---|---|---|---|
| Secondary Cell info list | OP | 1 to <maxMultiCell-1> | | FDD only |
| >New H-RNTI | OP | | | |
| >Downlink 64QAM configured | OP | | Enumerated (TRUE) | Absence of this IE means that the secondary cell HS-SCCH does not use the 64QAM format. |
| >HS-DSCH TB size table | CV-Not64QAM | | Enumerated (octet aligned) | If this IE is present, octet aligned table is used, else bit aligned table is used. |
| >Primary CPICH info | MP | | Primary CPICH Info 10.3.6.60 | |
| >DL Scrambling Code | MD | | Secondary scrambling code 10.3.6.74 | DL Scrambling code to be applied for HS-DSCH and HS-SCCH. Default is same scrambling code as for the primary CPICH. |
| >Control mode indicator 1 | OP | | Enumerated (Available, Not-available) | |
| >Control mode indicator 2 | OP | | Enumerated (Available, Not-available) | |
| > HS-SCCH Channelisation Code Information | MP | 1 to <maxHSSCCHs > | | |
| >>HS-SCCH Channelisation Code | MP | | Integer (0..127) | |
| >Measurement Power Offset | MP | | Real (-6 .. 13 by step of 0.5) | The measurement power offset, Γ, in dB. |
| >>UARFCN downlink (Nd) | OP | | Integer(0 .. 16383) | |

Fig. 19

| IE/Group Name | Presence | Range | IE Type and Reference | Semantics Description |
|---|---|---|---|---|
| HS-SCCH Power Offset | OP | | INTEGER (0...255) | Unit: dB<br>Range: -32...+31.75 dB<br>Step: 0.25 dB |
| Measurement Power Offset | MP | | INTEGER (-12..26) | Unit: dB<br>Range: -6..13dB<br>Step: 0.5dB |
| Sixtyfour QAM Usage Allowed Indicator | OP | | ENUMERATED (Allowed, Not-Allowed) | |
| HS-DSCH-RNTI | MP | | INTEGER (0..65535) | |
| Control mode indicator 1 | OP | | Enumerated (Available, Not-available) | |
| Control mode indicator 2 | OP | | Enumerated (Available, Not-available) | |

Fig. 20

| Information Element/ Group name | Need | Multi | Type and reference | Semantics description |
|---|---|---|---|---|
| Secondary Cell info list | OP | 1 to \<maxMultiCell-1\> | | FDD only |
| \>New H-RNTI | OP | | | |
| \>Downlink 64QAM configured | OP | | Enumerated (TRUE) | Absence of this IE means that the secondary cell HS-SCCH does not use the 64QAM format. |
| \>HS-DSCH TB size table | CV-Not64QAM | | Enumerated (octet aligned) | If this IE is present, octet aligned table is used, else bit aligned table is used. |
| \>Primary CPICH info | MP | | Primary CPICH Info 10.3.6.60 | |
| \>DL Scrambling Code | MD | | Secondary scrambling code 10.3.6.74 | DL Scrambling code to be applied for HS-DSCH and HS-SCCH. Default is same scrambling code as for the primary CPICH. . |
| \>Control mode indicator 1 | OP | | Enumerated (Available, Not-available) | |
| \>Control mode indicator 2 | OP | | Enumerated (Available, Not-available) | |
| \>Control mode indicator 3 | OP | | Enumerated (Available, Not-available) | |
| \> HS-SCCH Channelisation Code Information | MP | 1 to \<maxHSSCCHs \> | | |
| \>\>HS-SCCH Channelisation Code | MP | | Integer (0..127) | |
| \>Measurement Power Offset | MP | | Real (-6 .. 13 by step of 0.5) | The measurement power offset, $\Gamma$, in dB. |
| \>\>UARFCN downlink (Nd) | OP | | Integer(0 .. 16383) | |

Fig. 21

| IE/Group Name | Presence | Range | IE Type and Reference | Semantics Description |
|---|---|---|---|---|
| HS-SCCH Power Offset | OP | | INTEGER (0...255) | Unit: dB<br>Range: -32 .. +31.75 dB<br>Step: 0.25 dB |
| Measurement Power Offset | MP | | INTEGER (-12..26) | Unit: dB<br>Range: -6..13dB<br>Step: 0.5dB |
| Sixtyfour QAM Usage Allowed Indicator | OP | | ENUMERATED<br>(Allowed, Not-Allowed) | |
| HS-DSCH-RNTI | MP | | INTEGER (0..65535) | |
| Control mode indicator 1 | OP | | Enumerated (Available, Not-available) | |
| Control mode indicator 2 | OP | | Enumerated (Available, Not-available) | |
| Control mode indicator 3 | OP | | Enumerated (Available, Not-available) | |

Fig. 22

RADIO COMMUNICATION SYSTEM, BASE STATION, MOBILE STATION, CONTROL METHOD OF BASE STATION, CONTROL METHOD OF MOBILE STATION, AND STORAGE MEDIUM STORING PROGRAM

CROSS REFERENCE TO RELATED APPLICATIONS

This application is a National Stage of International Application No. PCT/JP2010/000745 filed Feb. 8, 2010, claiming priority based on Japanese Patent Application No. 2009-060559 filed Mar. 13, 2009, the contents of all of which are incorporated herein by reference in their entirety.

TECHNICAL FIELD

The present invention relates to a radio communication system that performs communication between a base station and a mobile station by using a plurality of carriers (carrier waves) having different frequencies simultaneously at least for one of the uplink direction and the downlink direction, such as MC-HSDPA (Multi-Carrier HSDPA operation) and DC-HSUPA (Dual Cell High Speed Uplink Packet Access).

BACKGROUND ART

As one of technologies to increase the communication speed of mobile stations located at cell edges, DC-HSDPA using existing HSDPA (High Speed Downlink Packet Access) has been examined in Release 8 of 3GPP (3rd Generation Partnership Project). DC-HSDPA uses two adjacent carrier frequency bands (each of which is 5 MHz) within the same frequency band in order to increase the downlink speed. The general idea of DC-HSDPA, which has been currently examined in 3GPP, is explained hereinafter. Note that the details of DC-HSDPA technique are explained in 3GPP Technical Specification (Non-patent literatures 1 to 3).

In DC-HSDPA, a first serving HS-DSCH cell is simply referred to as "serving HS-DSCH cell". Further, a second serving HS-DSCH cell is referred to as "secondary-serving HS-DSCH cell". The second serving HS-DSCH cell is dependently formed on condition that the first serving HS-DSCH cell is already generated. Note that the serving HS-DSCH cell may be also referred to as "primary carrier" or "base carrier". Meanwhile, the secondary-serving HS-DSCH cell may be also referred to as "secondary carrier" or "extended carrier".

The first serving HS-DSCH cell can use all the HSDPA physical channels (which are described later) for communication with mobile stations. In contrast to this, the second serving HS-DSCH cell of DC-HSDPA uses part of the control information of the first serving HS-DSCH cell for communication with mobile stations. By using this common control information, the second serving HS-DSCH cell can be operated by just setting some of the physical channels of HSDPA (which are described later), and thereby preventing the use efficiency of radio resources from being lowered due to the redundant transmission of the control information.

In this specification, in order to clearly distinguish between these two serving HS-DSCH cells, the first serving HS-DSCH cell is referred to as "primary-serving HS-DSCH cell". Further, in the following explanation, the primary-serving HS-DSCH cell and the secondary-serving HS-DSCH cell may be also referred to as simply "primary cell" and "secondary cell" respectively.

FIG. 23 shows physical channels used to perform packet communication using DC-HSDPA between a base station 91 supporting DC-HSDPA and a mobile station 92. HS-PDSCH is a downlink physical channel for data transmission, and transfers a transport channel HS-DSCH. HS-SCCH is used for transmission of downlink signaling information about HS-DSCH transfer.

HS-DPCCH is an uplink physical channel used to transmit feedback information about HS-DSCH transfer from the mobile station 92 to the base station 91. This feedback information includes an ACK response regarding a hybrid ARQ (Automatic repeat-request), and a CQI (channel Quality Indication). When a secondary cell is used, information of both the primary cell and the secondary cell is multiplexed in the feedback information in HS-DPCCH of the primary cell.

The uplink DPCH and the downlink DPCH are used for transmission/reception of control information about DC-HSDPA, uplink/downlink power control, reporting of measurement information to a base station, and the like. Further, in addition to the uplink DPCH, E-DCH can be also used for uplink communication. The details of E-DCH are explained in 3GPP Technical Specification (Non-patent literature 4). Note that other common channels indispensable for the generation of a primary cell and a secondary cell (such as P-CPICH, SCH, P-CCPCH and S-CCPCH) are also used.

The formal names of the physical channels and transport channels, which are shown in abbreviated names in the above explanation, are shown below.

P-CPICH: Primary Common Pilot Channel
DPCH: Dedicated Physical Channel
HS-DPCCH: Dedicated Physical Control Channel (uplink) for HS-DSCH
HS-DSCH: High Speed Downlink Shared Channel
HS-PDSCH: High Speed Physical Downlink Shared Channel
HS-SCCH: Shared Control Channel for HS-DSCH
P-CCPCH: Primary Common Control Physical Channel
S-CCPCH: Secondary Common Control Physical Channel
SCH: Synchronization Channel
E-DCH: Enhanced Dedicated Channel Further, in 3GPP Release 9, MC-HSDPA (Multi-Carrier HSDPA operation) has been examined as a method for extending DC-HSDPA. MC-HSDPA uses a combination of carrier frequency bands belonging to different frequency bands, i.e., a combination of carrier frequency bands that are not adjacent to each other but are away from each other is used for a primary cell and a secondary cell. The details of MC-HSDPA are explained in Non-patent literature 5.

CITATION LIST

Non Patent Literature

Non patent literature 1: 3GPP, TS25.211 v8.3.0 (2008-12), "Physical channels and mapping of transport channels onto physical channels (FDD) (Release 8)"
Non patent literature 2: 3GPP, TS25.212 v8.4.0 (2008-12), "Multiplexing and channel coding (FDD) (Release 8)"
Non patent literature 3: 3GPP, TS25.214 v8.4.0 (2008-12), "Physical layer procedures (FDD) (Release 8)"
Non patent literature 4: 3GPP, TS25.319 v8.4.0 (2008-12), "Enhanced uplink; Overall description; Stage 2 (Release 8)"
Non patent literature 5: 3GPP TSG-RAN Pleanry#43, RP-081123, Work Item Description "Multi-carrier evolution", December 2008

SUMMARY OF INVENTION

Technical Problem

In DC-HSDPA according to 3GPP Release 8, adjacent carrier frequency bands are used for a primary cell and a secondary cell. Further, the radio environments of the primary cell and the secondary cell are assumed to be similar to each other, so that the power control for the primary cell and information of the primary cell measured by a mobile station are also used for the secondary cell. In this way, it is possible to eliminate the need for power control of the secondary cell and reporting of information about the secondary cell measured by the mobile station. With this assumption, it is unnecessary to set all the uplink physical channels including DPCH used for power control of the secondary cell, uplink DPCH for reporting of information about the secondary cell measured by a mobile station, and E-DCH when DC-HSDPA is carried out.

In contrast to this, as explained above, in MC-HSDPA, which has been examined in 3GPP Release 9, the use of carrier frequency bands that are not adjacent to each other has been examined. When a carrier frequency band that is away from the carrier frequency band of the primary cell is used for the secondary cell, the radio environments of the primary cell and the secondary cell can no longer be assumed to be similar to each other. Therefore, it is assumed that DPCH used for power control of the secondary cell, DPCH for reporting of measurement information of the secondary cell, and E-DCH are set separately on the secondary cell. In the following explanation, power control for the secondary cell, reporting of measurement information of the secondary cell, and setting control of uplink channel of the secondary cell, which are performed by using radio channels in the secondary cell, are collectively referred to as "secondary cell control".

FIG. 24 shows physical channels used to perform packet communication using MC-HSDPA between a base station 91 supporting MC-HSDPA and a mobile station 92. Note that FIG. 24 is created by the inventor of the present application on the assumption that a channel(s) is added to perform the secondary cell control, and thus is not a figure illustrating any publicly-known technique. Uplink DPCH and downlink DPCH that are defined for the secondary cell are the channels for the secondary cell control.

The inventor of the present application has found out that if the secondary cell control of MC-HSDPA is performed at all times, the following problems occur. If the secondary cell control is performed at all times in MC-HSDPA, it is expected that the radio quality of a secondary cell is improved in the cases where a carrier frequency band away from the carrier frequency band of the primary cell is used for the secondary cell. However, in the cases where the carrier frequency bands for the primary cell and the secondary cell are adjacent to each other, it is expected that the power control of the primary cell and information measured by a mobile station can be also used for the secondary cell as in the case of DC-HSDPA. Nevertheless, if the additional DPCH, E-DPDCH, and the like are constantly set for the secondary cell, there is a possibility that the overhead of the control signals is increased, and thereby deteriorating the use efficiency of the radio resources in comparison to DC-HSDPA. On the other hand, if the secondary cell control is not performed at all, no problem occurs in the cases where the carrier frequency bands for the primary cell and the secondary cell are adjacent to each other. However, in the cases where the carrier frequency bands for the primary cell and the secondary cell are away from each other, the radio environments of the primary cell and the secondary cell are significantly different from each other. Therefore, there is a possibility that the secondary cell control is not sufficiently performed, and thereby deteriorating the radio quality of the secondary cell.

Note that although both of the above-described DC-HSDPA and MC-HSDPA are techniques for increasing the downlink packet communication speed, similar problems also occur when the dual-cell operation is applied to the high-speed uplink packet communication called "HSUPA (High Speed Uplink Packet Access)" or "EUL (Enhanced Uplink)"

The present invention has been made in consideration of the above-described problems, and an object thereof is to effectively cope with the two problems, which are in a trade-off relation (contradictory relation) between the deterioration of the use efficiency of the radio resources and the deterioration of the radio quality of the secondary cell, in a radio communication system, such as MC-HSPA system, in which both a combination of carrier frequency bands that are away from each other and a combination of carrier frequency bands that are adjacent to each other can be alternatively used as the combination of carrier frequency bands for the primary cell and the secondary cell.

Solution to Problem

A radio communication system according to a first aspect of the present invention includes a mobile station, and a base station configured to perform radio communication with the mobile station by using first and second carrier frequency bands simultaneously for at least one of an uplink direction and a downlink direction. Further, the mobile station and the base station are configured to be able to switch whether or not to perform control relating to the second carrier frequency band by using a radio channel transmitted on the second carrier frequency band.

A base station according to a second aspect of the present invention includes radio communication unit and a control unit. The radio communication unit is able to perform radio communication with a mobile station by using first and second carrier frequency bands simultaneously for at least one of an uplink direction and a downlink direction. Further, the control unit is able to switch whether or not to perform control relating to the second carrier frequency band by using a radio channel transmitted on the second carrier frequency band.

A mobile station according to a third aspect of the present invention includes radio communication unit and a control unit. The radio communication unit is able to perform radio communication with a base station by using first and second carrier frequency bands simultaneously for at least one of an uplink direction and a downlink direction. Further, the control unit is able to switch whether or not to perform control relating to the second carrier frequency band by using a radio channel transmitted on the second carrier frequency band.

A fourth aspect according to the present invention is a control method of a base station capable of performing radio communication with a mobile station by using first and second carrier frequency bands simultaneously for at least one of an uplink direction and a downlink direction. The method includes a step of switching whether or not to perform control relating to the second carrier frequency band by using a radio channel transmitted on the second carrier frequency band.

A fifth aspect according to the present invention is a control method of a mobile station capable of performing radio communication with a base station by using first and second carrier frequency bands simultaneously for at least one of an uplink direction and a downlink direction. The method includes a step of switching whether or not to perform control relating to the second carrier frequency band by using a radio channel transmitted on the second carrier frequency band.

A sixth aspect according to the present invention is a program that causes a computer to execute processing relating to a base station capable of performing radio communication with a mobile station by using first and second carrier frequency bands simultaneously for at least one of an uplink direction and a downlink direction. The processing, which is provided by the computer executing the program, includes switching whether or not to perform control relating to the second carrier frequency band by using a radio channel transmitted on the second carrier frequency band.

A seventh aspect according to the present invention is a program that causes a computer to execute processing relating to a mobile station capable of performing radio communication with a base station by using first and second carrier frequency bands simultaneously for at least one of an uplink direction and a downlink direction. The processing, which is provided by the computer executing the program, includes switching whether or not to perform control relating to the second carrier frequency band by using a radio channel transmitted on the second carrier frequency band.

Advantageous Effects of Invention

According to each of the above-described aspects of the present invention, it is possible to provide a radio communication system, a base station, a base station control apparatus, a mobile station a program, and a control method of a cell, capable of effectively coping with the two problems, which are in a trade-off relation (contradictory relation) between the deterioration of the use efficiency of the radio resources and the deterioration of the radio quality of the secondary cell, in the cases where both a combination of carrier frequency bands that are away from each other and a combination of carrier frequency bands that are adjacent to each other can be alternatively used as the combination of carrier frequency bands for a primary cell and a secondary cell.

BRIEF DESCRIPTION OF DRAWINGS

FIG. 17 is a table showing an example of secondary cell setting information contained in an RRC message;

FIG. 18 is a table showing an example of secondary cell setting information contained in an NBAP message;

FIG. 19 is a table showing an example of secondary cell setting information contained in an RRC message;

FIG. 20 is a table showing an example of secondary cell setting information contained in an NBAP message;

FIG. 21 is a table showing an example of secondary cell setting information contained in an RRC message;

FIG. 22 is a table showing an example of secondary cell setting information contained in an NBAP message;

DESCRIPTION OF EMBODIMENTS

Specific exemplary embodiments to which the present invention is applied are explained hereinafter with reference to the drawings. The same signs are assigned to the same components throughout the drawings, and duplicated explanation is omitted as appropriate for simplifying the explanation.

First Exemplary Embodiment

In a first exemplary embodiment, a base station control apparatus 30 determines the enabling/disabling of secondary cell control, and notifies the secondary cell control information to a base station 10 and a mobile station 20.

Figure 1:
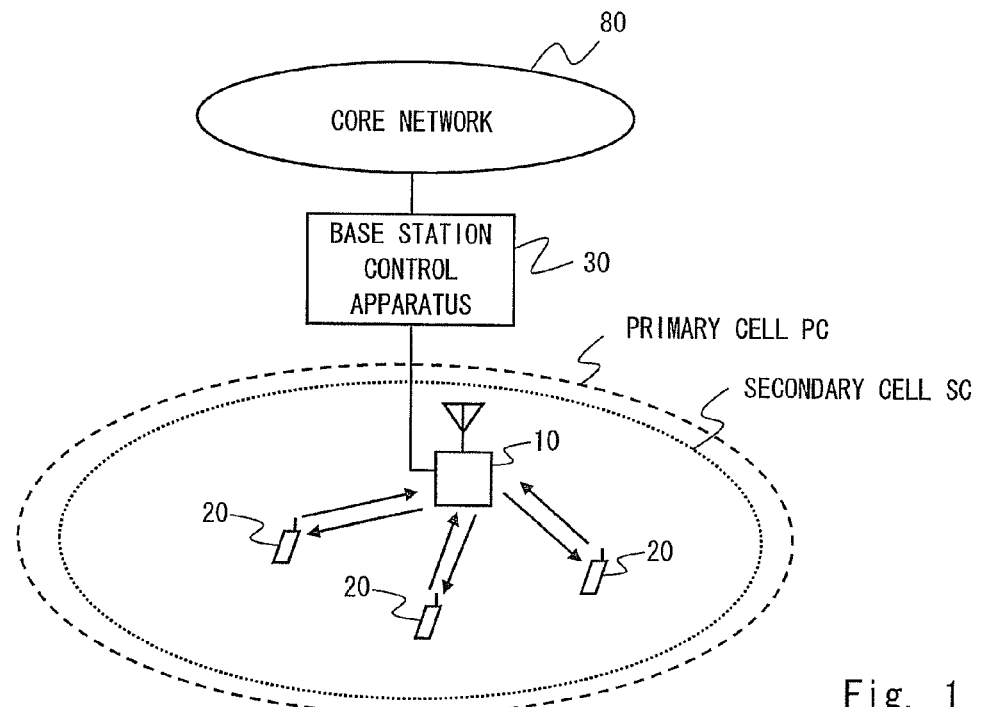
FIG. 1 shows a communication system according to an exemplary embodiment of the present invention.

FIG. 1 shows a configuration example of a radio communication system including a base station 10 according to this exemplary embodiment. Note that the following explanation is made on the assumption that a radio communication system in accordance with this exemplary embodiment is a radio communication system of FDD (Frequency Division Duplex)-CDMA type, more specifically, of W-CDMA type.

The base station 10 is connected to a core network 80 of a mobile communications company through a base station control apparatus 30, and relays traffic between a mobile station 20 and the core network 80. The base station 10 supports MC-HSDPA, and generates a primary cell and a secondary cell having mutually different frequency channels (carrier frequency bands). The base station 10 transmits common physical channels (such as P-CPICH and SCH) that are used to form the primary and secondary cells, and also transmits a physical channel (HS-PDSCH) through which HS-DSCH is conveyed in each of the two serving HS-DSCH cells. Further, the base station 10 is capable of changing implementation/non-implementation of secondary cell control, or changing the item(s) to be controlled of the secondary cell control.

The base station control apparatus 30 configures the base station 10 to form a secondary cell and a primary cell. Configuration examples of the base station 10, the mobile station 20 and the base station control apparatus 30, and details of a procedure for changing a secondary cell control method are explained hereinafter one by one.

Note that although only one secondary cell is shown in FIG. 1, two or more secondary cells may be formed by the base station 10. This exemplary embodiment is explained on the assumption that the base station 10 forms only one secondary cell for the sake of explanation.

Figure 2:
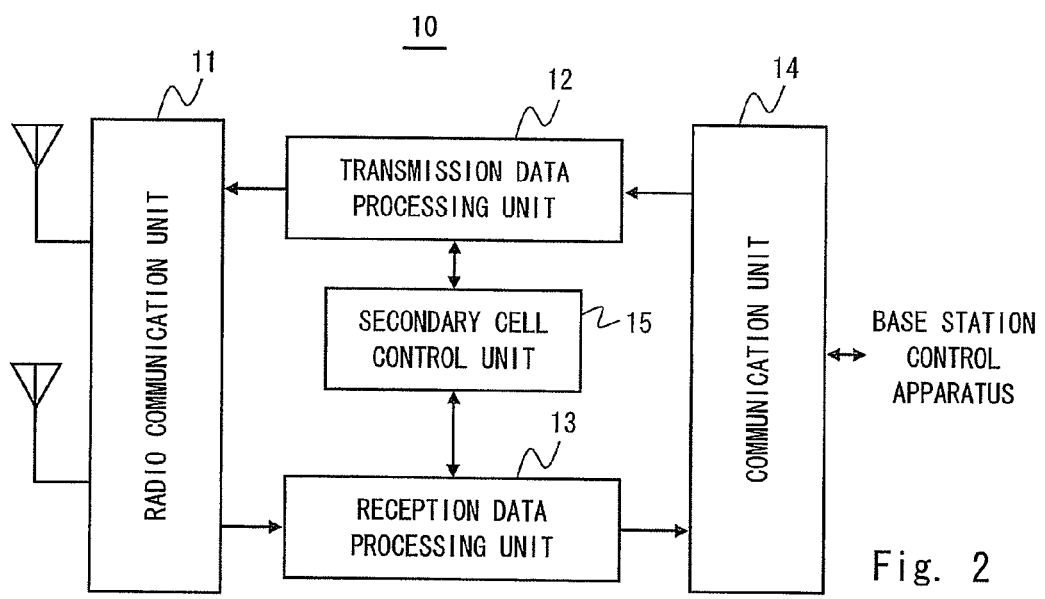
FIG. 2 is a block diagram showing a configuration example of a base station shown in FIG. 1.

FIG. 2 is a block diagram showing a configuration example of the base station 10. In FIG. 2, a radio communication unit 11 receives an uplink signal transmitted from the mobile station 20. A reception data processing unit 13 restores received data by performing various processes such as inverse spreading, RAKE combining, deinterleaving, channel decoding, and error correction on the received uplink signal. The obtained reception data is sent to the base station control apparatus 30 through a communication unit 14. Incidentally, it has been examined to provide a base station with the function of a base station control apparatus so that the base station can perform autonomous radio resource control. Accordingly, the base station 10 may have the base station control apparatus function. In the case where the base station 10 has the base station control apparatus function, when the reception data obtained by the reception data processing unit 13 is a location registration request or a radio channel establishment request from the mobile station 20, the reception data is sent to a base station control apparatus function unit (not shown) of the base station 10 to perform these controls.

A transmission data processing unit 12 obtains, from the communication unit 14, transmission data to be transmitted toward the mobile station 20, and generates a transport channel by performing error correction encoding, rate matching, interleaving, and the like. Further, the transmission data processing unit 12 generates a radio frame by adding control information such as a TPC (Transmit Power Control) bit to a data series of the transport channel. Further, the transmission data processing unit 12 generates a transmission symbol sequence by performing diffusion processing and symbol mapping. The radio communication unit 11 generates a downlink signal by performing various processes such as quadrature modulation, frequency conversion, and signal amplification on the transmission symbol sequence, and transmits the generated downlink signal to the mobile station 20.

A secondary cell control unit 15 obtains secondary cell control information notified from the base station control apparatus 30, through the communication unit 14. The secondary cell control unit 15 instructs the radio communication unit 11 about the change of the secondary cell control based on the obtained secondary cell control information.

Figure 3:
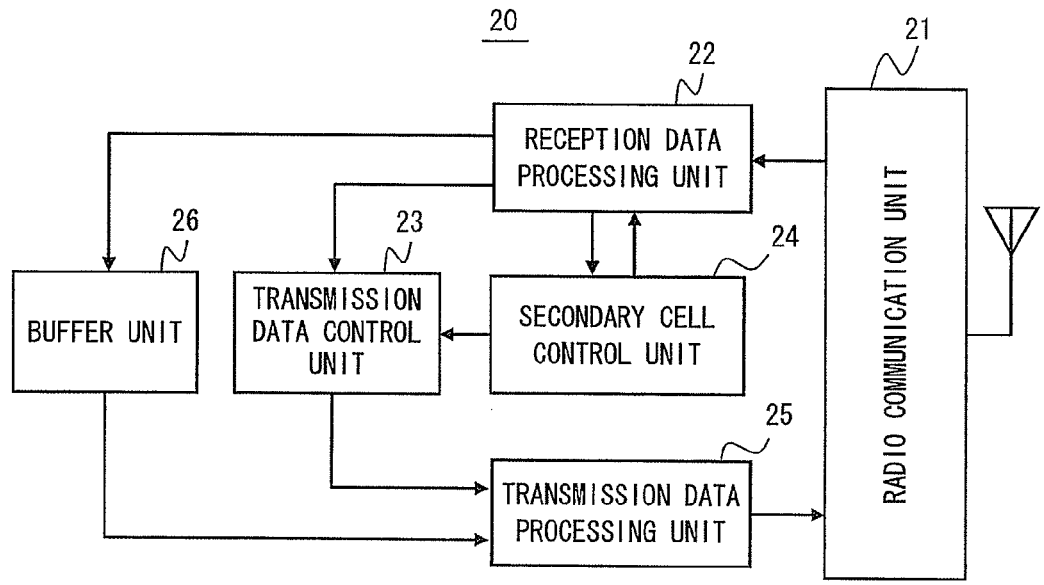
FIG. 3 is a block diagram showing a configuration example of a mobile station shown in FIG. 1.

FIG. 3 is a block diagram showing a configuration example of the mobile station 20. A radio communication unit 21 receives a downlink signal through an antenna. A reception data processing unit 22 restores reception data from the received downlink signal, and sends the restored data to a buffer unit 26. The reception data stored in the buffer unit 26 is read out and used according to its purpose. A transmission data processing unit 25 and the radio communication unit 21 generate an uplink signal by using transmission data stored in the buffer unit 26, and transmit the generated uplink signal toward the base station 10.

A secondary cell control unit 24 obtains secondary cell setting information from the reception data processing unit 22. Note that the secondary cell setting information contains secondary cell control information. The secondary cell control information is generated by the base station control apparatus 30, and contains information indicating whether secondary cell control should be performed or not. The secondary cell control unit 24 instructs the transmission data processing unit 25 to enable or disable the secondary cell control, according to the secondary cell control information, through the reception data processing unit 22 and a transmission data control unit 23.

Figure 4:
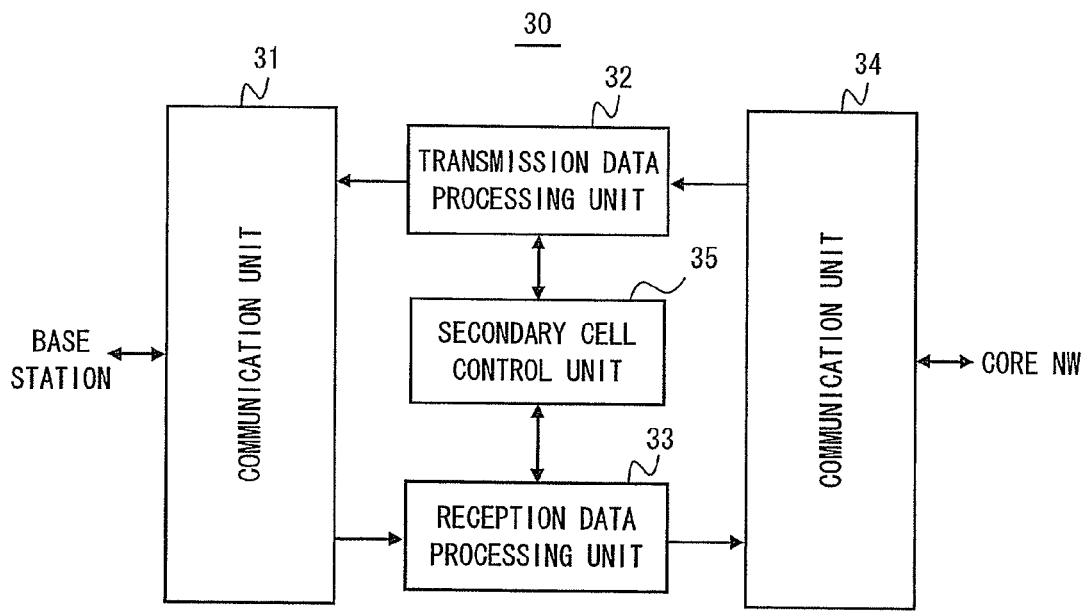
FIG. 4 is a block diagram showing a configuration example of a base station control apparatus shown in FIG. 1.

FIG. 4 is a block diagram showing a configuration example of the base station control apparatus 30. In FIG. 4, a communication unit 31 receives a signal transmitted from the base station 10. A reception data processing unit 33 transfers received data to the core network 80 through a communication unit 34. A transmission data processing unit 32 obtains transmission data to be transmitted toward the mobile station 20 and the base station 10 from the communication unit 34. A secondary cell control unit 35 manages information relating to a secondary cell, and notifies (transmits) secondary cell setting information containing secondary cell control information from the communication unit 31 to the base station 10 and the mobile station 20.

Figure 5:
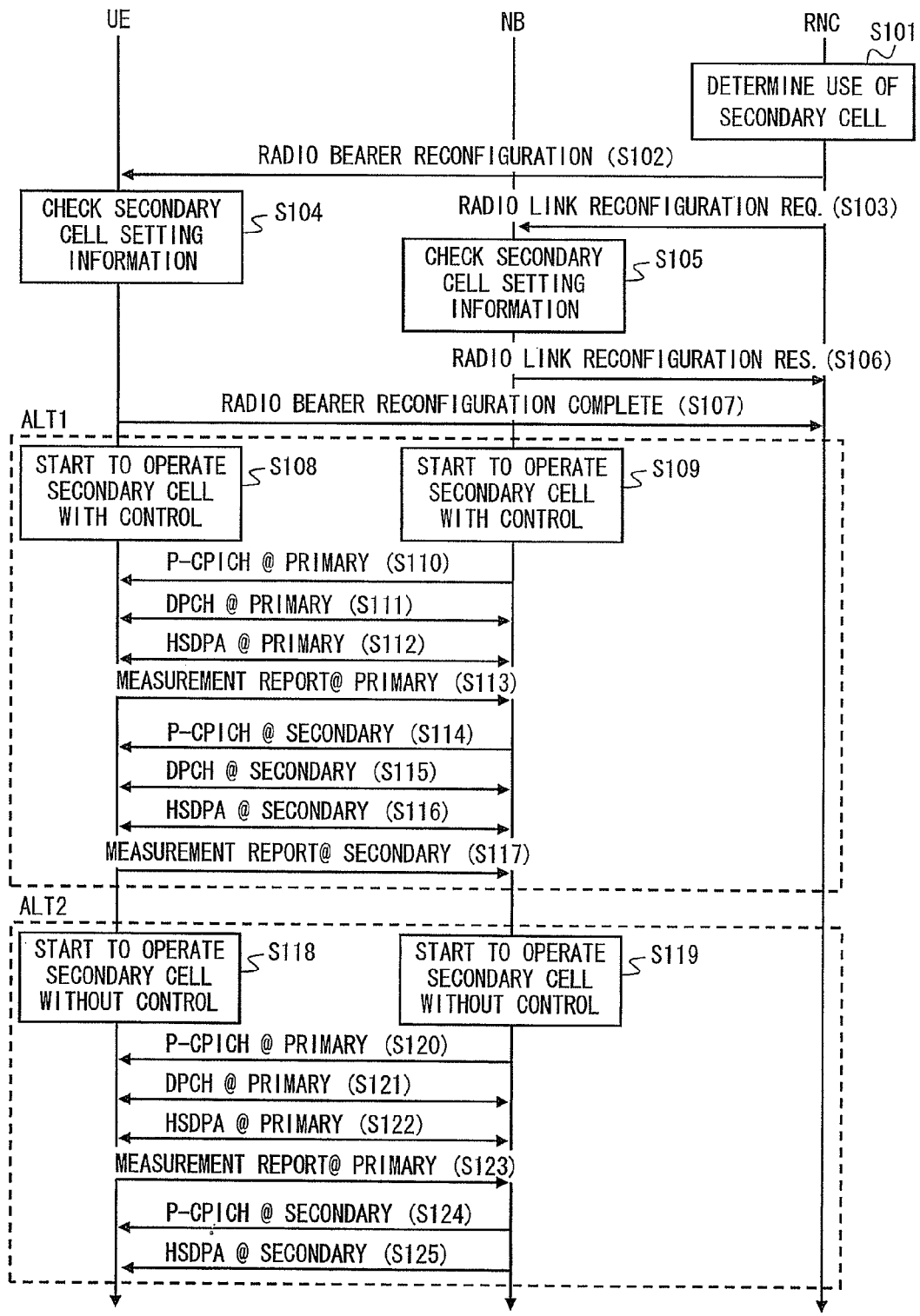
FIG. 5 is a sequence diagram showing an example in which control information of a secondary cell is changed.

Next, a specific example of a procedure for changing a secondary cell control method is explained with reference to FIGS. 5 to 7. FIG. 5 is a sequence diagram showing an example of a procedure which is performed when a secondary cell is newly created, and in which the necessity/non-necessity of secondary cell control is determined and the secondary cell control in the base station 10 and the mobile station 20 is enabled (ALT1 in FIG. 5) or disabled (ALT2 in FIG. 5) based on this determination result. FIG. 5 shows interactions among the base station control apparatus 30, the base station 10, and the mobile station 20. In the figure, "RNC", "NB", and "UE" correspond to the base station control apparatus 30, the base station 10, and the mobile station 20 respectively.

In a step S101, the base station control apparatus 30 determines whether a secondary cell should be used based on the load state of the radio resources, the transmission data amount, or the like. When a secondary cell is determined to be used, the base station control apparatus 30 further determines whether secondary cell control should be enabled based on the condition such as a frequency distance between the frequency of the primary cell and the frequency of the secondary cell. When the secondary cell is used, the base station control apparatus 30 notifies the mobile station 20 of secondary cell setting information by using "Radio Bearer Reconfiguration", which is one of RRC messages (S102). Further, the base station control apparatus 30 also notifies the base station 10 of the secondary cell setting information by using "Radio Link Reconfiguration Request", which is one of NBAP messages (S103). The details of RRC messages and NBAP messages including the message structures thereof are explained in 3GPP TS 25.331 V8.5.0 (2009-01) "Radio Resource Control (RRC)", and 3GPP TS25.433 V8.3.0 (2008-12) "UTRAN Iub interface Node B Application Part (NBAP) signaling".

In a step S104, the mobile station 20 confirms secondary cell control information contained in the secondary cell setting information notified from the base station control apparatus 30, and transmits a confirmation completion notification to the base station control apparatus 30 by using "Radio Bearer Reconfiguration Complete" (step S107). Similarly, the base station 10 confirms the secondary cell control information contained in the secondary cell setting information notified from the base station control apparatus 30 (step S105), and transmits a confirmation completion notification by using "Radio Link Reconfiguration Response" (step S106).

In steps S108 to S125, implementation/non-implementation of the secondary cell control is configured in accordance with the notified secondary cell control information, and the transmission of physical channels is performed in the primary cell and the secondary cell. The steps S108 to S117 represent a sequence that is performed when the secondary cell control is enabled, whereas the steps S118 to S125 represent a sequence that is performed when the secondary cell control is disabled.

In the steps S108 and S109, the base station 10 and the mobile station 20 determine to operate a secondary cell for which secondary cell control is enabled. In the steps S110 to S112, P-CPICH, DPCH, and a group of physical channels relating to HSDPA of the primary cell are transmitted/received between the base station 10 and the mobile station 20. The physical channel group indicated as "HSDPA@Primary" in the figure includes a downlink HS-SCCH, a downlink HS-PDSCH, and an uplink HS-DPCCH. In the steps S114 to S116, P-CPICH, DPCH, and a group of physical channels relating to HSDPA of the secondary cell are transmitted/received. Similarly to "HSDPA@Primary", the physical channel group indicated as "HSDPA@Secondary" in the figure includes a downlink HS-SCCH, a downlink HS-PDSCH, and an uplink HS-DPCCH. "Measurement Report" shown in the figure is a message that is used to notify a downlink transmission power measured by the mobile station 20, received powers of other frequencies, and the like to the base station. Measurement Report is carried out in both the primary cell and the secondary cell in this sequence example. Measurement Report of the secondary cell is transmitted by using an uplink channel set on the secondary cell or an uplink channel set on the primary cell.

In the steps S118 and S119, the base station 10 and the mobile station 20 determine to operate a secondary cell for which secondary cell control is disabled. In the steps S120 to S123, according to the primary cell, P-CPICH, DPCH and a group of physical channels relating to HSDPA, and Measurement Report are transmitted/received between the base station 10 and the mobile station 20. In the steps S124 and S125, according to the secondary cell, P-CPICH and a group of physical channels relating to HSDPA of the secondary cell are transmitted from the base station 10 to the mobile station 20. Since the secondary cell control is disabled, the physical channel group indicated as "HSDPA@Secondary" does not include HS-DPCCH, and the transmission/reception of DPCH by the mobile station 20 and the transmission of Measurement Report are not performed.

Figure 6:
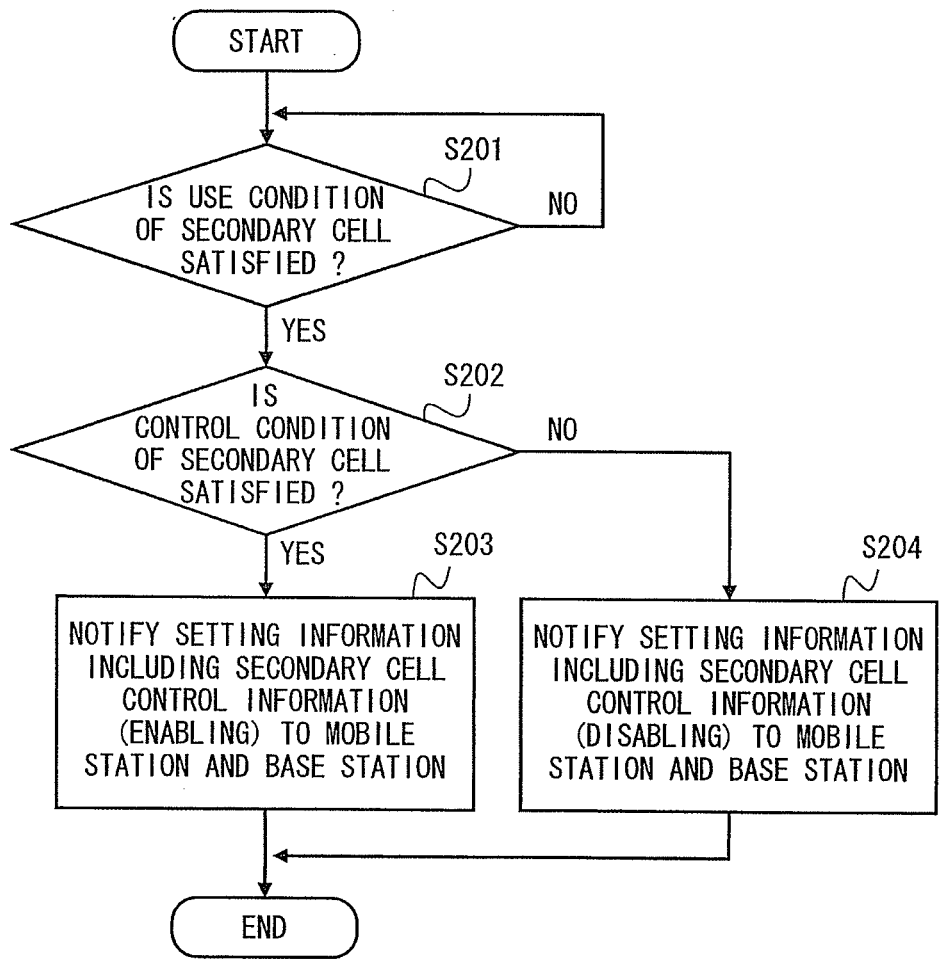
FIG. 6 is a flowchart relating to a change method of secondary cell control performed by a base station control apparatus according to first to third exemplary embodiments of the present invention.

FIG. 6 is a flowchart relating to a change of secondary cell control performed by the base station control apparatus 30. In a step S201, the secondary cell control unit 35 determines whether the use condition of the secondary cell is satisfied or not based on the load state of the radio resources, the transmission data amount, or the like. When the use condition is not satisfied (No at S201), the secondary cell control unit 35 repeats the determination process in the step S201. When the use condition is satisfied (Yes at S201), the secondary cell control unit 35 determines the necessity/non-necessity of the secondary cell control (step S202). As a specific example, when the frequency distance between the center frequency fp of the carrier frequency band of the secondary cell and the center frequency fs of the carrier frequency band of the primary cell is smaller than a predefined value $f_{th}$ ($f_{th} \geq |fp-fs|$), the secondary cell control unit 35 may determine that the secondary cell control is "unnecessary". On the other hand, when the frequency distance is greater than the predefined value $f_{th}$ ($f_{th} < |fp-fs|$), the secondary cell control unit 35 may determine that the secondary cell control is "necessary".

When the secondary cell control is determined to be "necessary" (Yes at step S202), the secondary cell control unit 35 notifies secondary cell setting information containing secondary cell control information indicating "enabling" to the base station 10 and the mobile station 20 (step S203). On the other hand, when the secondary cell control is determined to be "unnecessary" (No at step S202), the secondary cell control unit 35 notifies secondary cell setting information containing secondary cell control information indicating "disabling" to the base station 10 and the mobile station 20 (step S204).

A table shown in FIG. 17 shows an example of secondary cell setting information (Radio Bearer Reconfiguration) contained in an RRC message notified from the base station control apparatus 30 to the mobile station 20. Further, a table shown in FIG. 18 shows an example of secondary cell setting information (Radio Link Reconfiguration Request) contained in an NBAP message notified from the base station control apparatus 30 to the base station 10. The information element "Control mode indicator" shown in FIGS. 17 and 18 corresponds to the secondary cell control information. The data type of "Control mode indicator" is an enumerated type, and has "available" or "not-available" as a set element.

In each of the examples of FIGS. 17 and 18, one information element (Control mode indicator) corresponding to the secondary cell control information is included. Therefore, when the examples of FIGS. 17 and 18 are used, the base station control apparatus 30 may notify the base station 10 and the mobile station 20 of the necessity/non-necessity (enabling or disabling) of the entire secondary cell control including power control relating to the secondary cell, reporting of measurement information, and uplink channel transmission by using this one information element (Control mode indicator).

Figure 7:
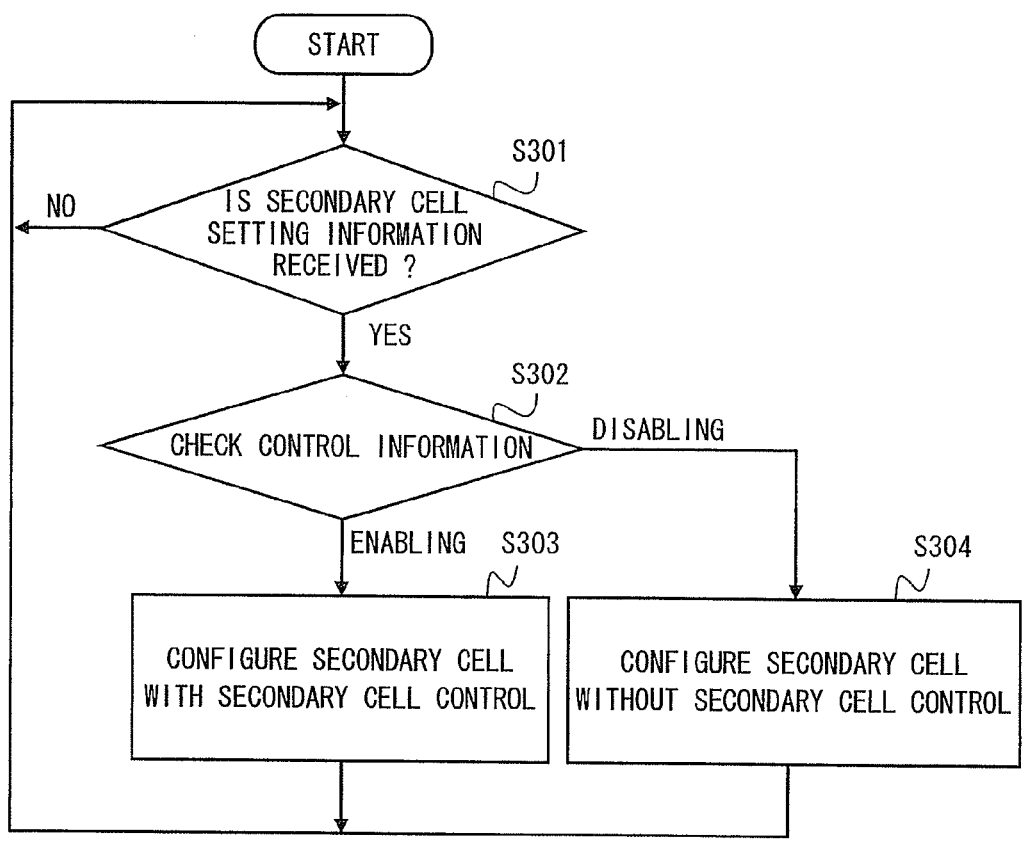
FIG. 7 is a flowchart relating to a change method of secondary cell control performed by a mobile station according to first to third exemplary embodiments of the present invention.

FIG. 7 shows a flowchart relating to a change of secondary cell control performed by the mobile station 20. In a step S301, the secondary cell control unit 24 determines whether secondary cell setting information is received or not. When the secondary cell setting information is not received (No at S301), the secondary cell control unit 24 repeats the determination process in the step S301. When the secondary cell setting information is received (Yes at S301), the secondary cell control unit 24 determines whether secondary cell control should be enabled or not (step S302). Specifically, in the step S302, the secondary cell control unit 24 may confirm the secondary cell control information. When the control information indicates enabling (Yes at S302), the secondary cell control unit 24 configures a secondary cell while enabling secondary cell control performed by the reception data processing unit 22 and the transmission data processing unit 25 (step S303). On the other hand, when the control information indicates disabling, the secondary cell control unit 24 configures a secondary cell based on the secondary cell setting information notified from the base station control apparatus 30 without implementing the secondary cell control performed by the reception data processing unit 22 and the transmission data processing unit 25 (S304).

Figure 8:
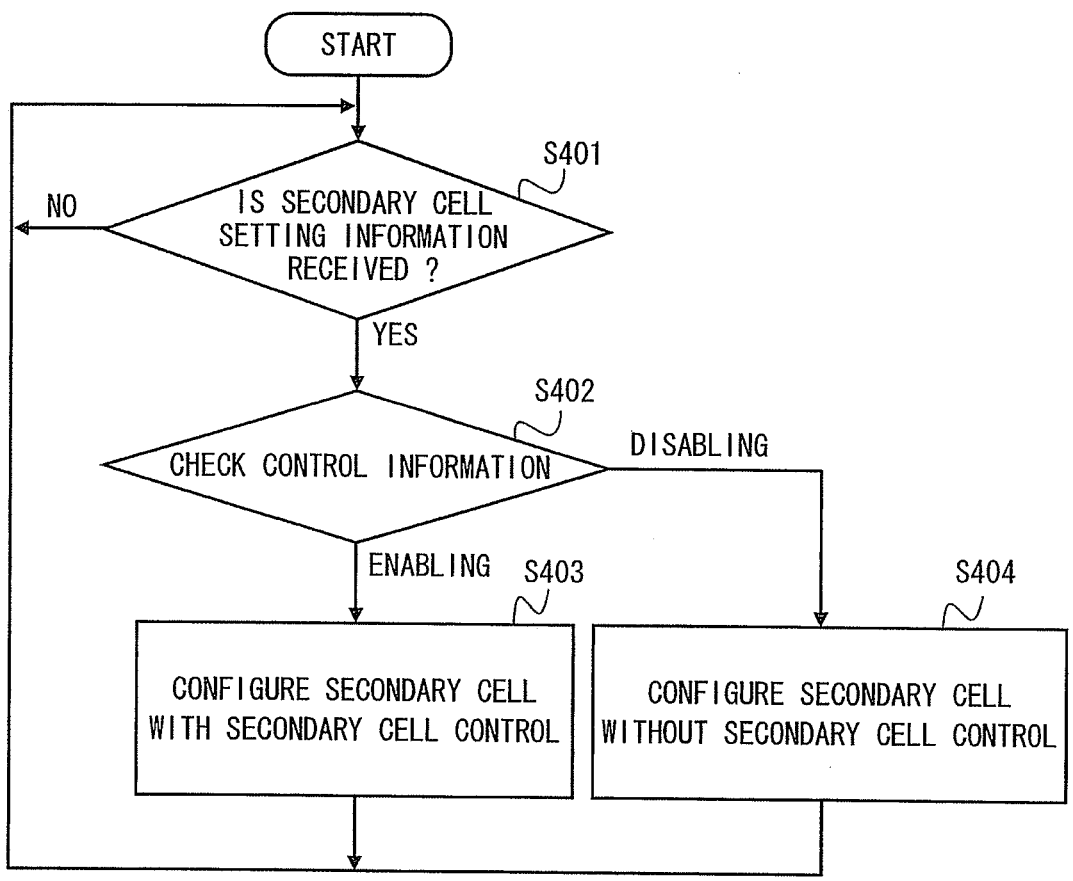
FIG. 8 is a flowchart relating to a change method of secondary cell control performed by a base station according to first to third exemplary embodiments of the present invention.

FIG. 8 shows a flowchart relating to a change of secondary cell control performed by the base station 10. In a step S401, the secondary cell control unit 15 determines whether secondary cell setting information is received or not. When the secondary cell setting information is not received (No at S401), the secondary cell control unit 15 repeats the determination process in the step S401. When the secondary cell setting information is received (Yes at S401), the secondary cell control unit 15 determines whether secondary cell control should be enabled or not (step S402). Specifically, in the step S402, the secondary cell control unit 15 may confirm the secondary cell control information. When the control information indicates enabling (Yes at S402), the secondary cell control unit 15 enables secondary cell control performed by the reception data processing unit 13 and the transmission data processing unit 12 (step S403). On the other hand, when the control information indicates disabling, the secondary cell control unit 15 configures a secondary cell based on the secondary cell setting information notified from the base station control apparatus 30 without implementing the secondary cell control performed by the reception data processing unit 13 and the transmission data processing unit 12 (S404).

As described above, the base station 10 and the mobile station 20 according to this exemplary embodiment can change the secondary cell control under instructions of the secondary cell control information from the base station control apparatus 30. For example, the contents of the secondary cell control information may be determined according to the frequency distance between the carrier frequency band of the primary cell and the carrier frequency band of the secondary cell. In this way, this exemplary embodiment effectively copes with the two problems, which are in a trade-off relation (contradictory relation) between the deterioration of the use efficiency of the radio resources and the deterioration of the radio quality of the secondary cell.

Second Exemplary Embodiment

Similarly to the first exemplary embodiment, a base station control apparatus 30 determines the necessity/non-necessity of secondary cell control, and notifies the secondary cell control information to a base station 10 and a mobile station 20 in a second exemplary embodiment. Meanwhile, in the first exemplary embodiment, a specific example in which the necessity/non-necessity (enabling or disabling) of the entire secondary cell control including power control, measurement information reporting, and uplink channel transmission is collectively controlled by using one information element is explained. In contrast to this, in the second exemplary embodiment, an example in which a plurality of information elements are used to convey secondary cell control to the base station 10 and the mobile station 20 is explained. That is, some of information elements are used to convey some of a plurality of control information items about secondary cell control and the other of the plurality of information elements are used to convey the other of the plurality of control information items. In the following explanation, the difference from the first exemplary embodiment, i.e., the use of a plurality of information elements is explained.

A table shown in FIG. 19 shows an example of secondary cell setting information (Radio Bearer Reconfiguration) contained in an RRC message notified from the base station control apparatus 30 to the mobile station 20. Further, a table shown in FIG. 20 shows an example of secondary cell setting information (Radio Link Reconfiguration Request) contained in an NBAP message notified from the base station control apparatus 30 to the base station 10.

In each of the tables of FIGS. 19 and 20, two information elements (Control mode indicators 1 and 2) corresponding to the secondary cell control information are included. For example, the base station control apparatus 30 may control the enabling/disabling of power control and measurement information reporting by using Control mode indicator 1, and control the enabling/disabling of uplink channel transmission by using Control mode indicator 2. Further, the assignments of the items to be controlled to Control mode indicators 1 and 2 may be changed as shown below.

(Modified Combination Example 1)
Control mode indicator 1: power control and uplink channel transmission
Control mode indicator 2: measurement information reporting (Modified Combination Example 2)
Control mode indicator 1: measurement information reporting and uplink channel transmission
Control mode indicator 2: power control As described above, the base station 10 and the mobile station 20 according to this exemplary embodiment can change detailed controls included in the secondary cell control (e.g., implementation/non-implementation of power control, implementation/non-implementation of uplink channel transmission, and implementation/non-implementation of measurement information reporting) in an individual manner according to the contents of instructions of the secondary cell control information notified by using a plurality of information elements. For example, the configuration of detailed controls can be individually defined according to various conditions such as the frequency distance between the carrier frequency band of the primary cell and the carrier frequency band of the secondary cell and the load ratio of the radio resources of the secondary cell. In this way, the base station 10 and the mobile station 20 according to this exemplary embodiment can not only determine whether the secondary cell control is implemented or not, but also define the items of the secondary cell control in a more detailed manner. Further, since a plurality of detailed control items (e.g., implementation/non-implementation of power control and implementation/non-implementation of measurement information reporting) are collectively controlled by using one information element, the amount of the information transmitted from the base station control apparatus is reduced, and thereby allowing a more efficient operation.

Third Exemplary Embodiment

Similarly to the first and second exemplary embodiments, a base station control apparatus 30 determines the necessity/non-necessity of secondary cell control, and notifies the secondary cell control information to a base station 10 and a mobile station 20 in a third exemplary embodiment. Further, in the third exemplary embodiment, an example in which the same number of information elements as the number of the detailed controls included in the secondary cell control are prepared and the enabling/disabling of each of the detailed controls is individually notified to the base station 10 and the mobile station 20 is explained.

A table shown in FIG. 21 shows an example of secondary cell setting information (Radio Bearer Reconfiguration) contained in an RRC message notified from the base station control apparatus 30 to the mobile station 20. Further, a table shown in FIG. 22 shows an example of secondary cell setting information (Radio Link Reconfiguration Request) contained in an NBAP message notified from the base station control apparatus 30 to the base station 10.

In each of the tables of FIGS. 19 and 20, three information elements (Control mode indicators 1 to 3) corresponding to the secondary cell control information are included. For example, the base station control apparatus 30 may associate each of three detailed controls consisting of the implementation/non-implementation of power control, the implementation/non-implementation of measurement information reporting, and the implementation/non-implementation of uplink channel transmission with a respective one of Control mode indicators 1 to 3. Note that the secondary cell control may include four or more detailed controls. In such cases, the number of information elements may be also increased according to the number of the detailed controls.

As described above, the base station 10 and the mobile station 20 according to this exemplary embodiment can change a plurality of detailed control items included in the secondary cell control (e.g., implementation/non-implementation of power control, implementation/non-implementation of uplink channel transmission, and implementation/non-implementation of measurement information reporting) in an individual manner according to the contents of instructions of the secondary cell control information notified by using a plurality of information elements. Further, only the necessary controls among the detailed control items can be selectively implemented according to various conditions such as the frequency distance between the carrier frequency band of the primary cell and the carrier frequency band of the secondary cell and the load ratio of the radio resources of the secondary cell, and thereby allowing a more efficient operation.

Fourth Exemplary Embodiment

In the first to third exemplary embodiments, examples in which the enabling/disabling of secondary cell control is determined when a secondary cell is newly established are shown. In a fourth exemplary embodiment, an example in which secondary cell control information is switched while the secondary cell is already in operation is explained.

Figure 9:
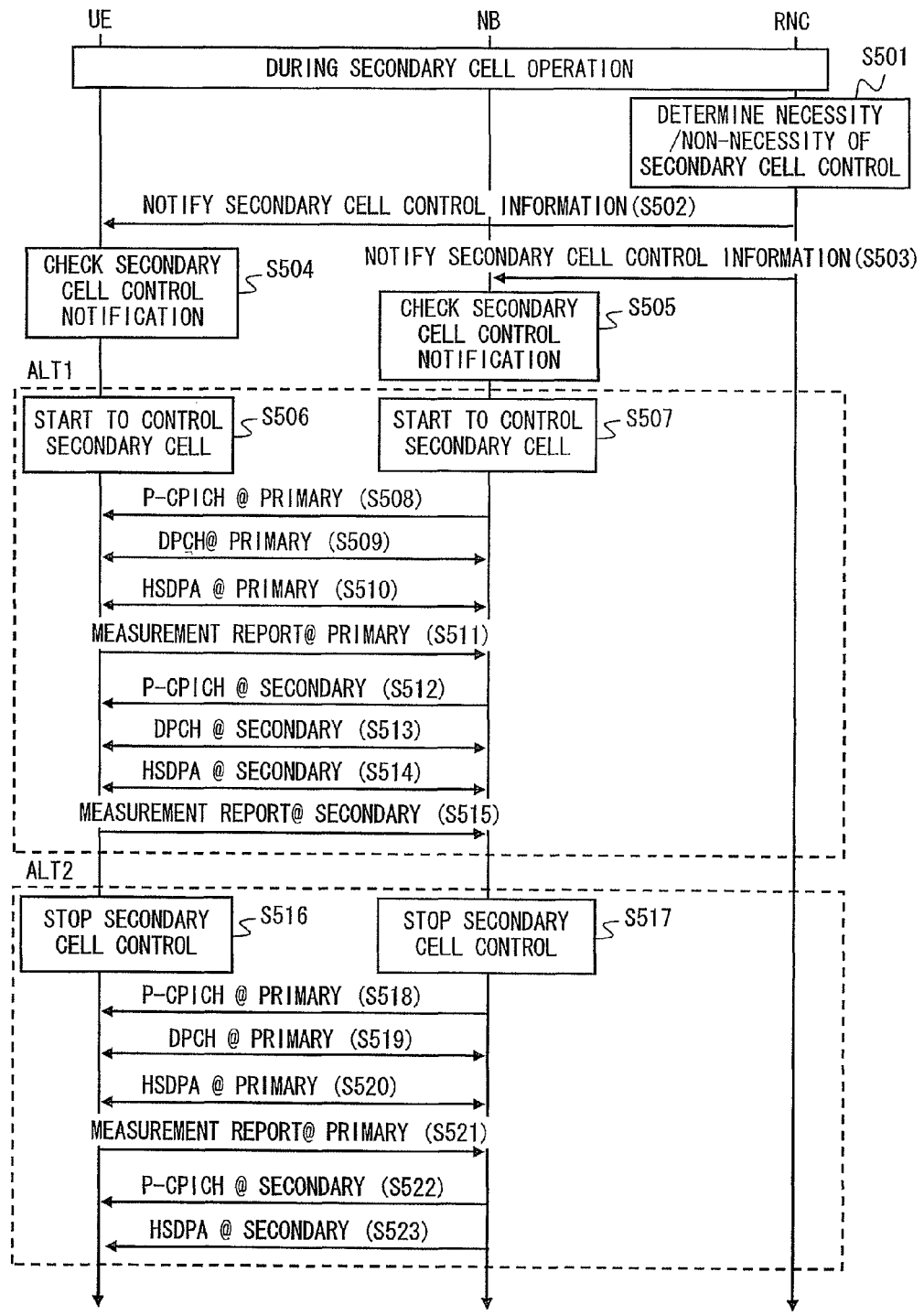
FIG. 9 is a sequence diagram showing an example of a procedure for changing secondary cell control.

A specific example of a procedure for changing secondary cell control is explained with reference to FIGS. 9 to 12. FIG. 9 is a sequence diagram showing an example of a procedure for changing secondary cell control while the secondary cell is already in operation.

In a step S501, the base station control apparatus 30 determines whether the secondary cell control should be changed or not based on the load state of the radio resources, the transmission data amount, or the like. When the secondary cell control should be changed, the base station control apparatus 30 notifies the secondary cell control information to the mobile station 20 and the base station 10 (S502 and S503). The notification of the secondary cell control information may be carried out by using "Radio Bearer Reconfiguration" and "Radio Link Reconfiguration Request" as explained above in the first to third exemplary embodiments.

In a step S504, the mobile station confirms the secondary cell control information contained in the secondary cell setting information notified from the base station control apparatus. Similarly, the base station 10 confirms the secondary cell control information contained in the secondary cell setting information notified from the base station control apparatus 30. Note that the mobile station 20 and the base station 10 may notify a confirmation completion notification to the base station control apparatus 30. For the confirmation completion notification, "Radio Link Reconfiguration Response" and "Radio Bearer Reconfiguration Complete" may be used as explained above in the first to third exemplary embodiments.

Steps S506 to S523 are similar to the steps S108 to S125 of the first exemplary embodiment, and therefore their explanation is omitted.

Figure 10:
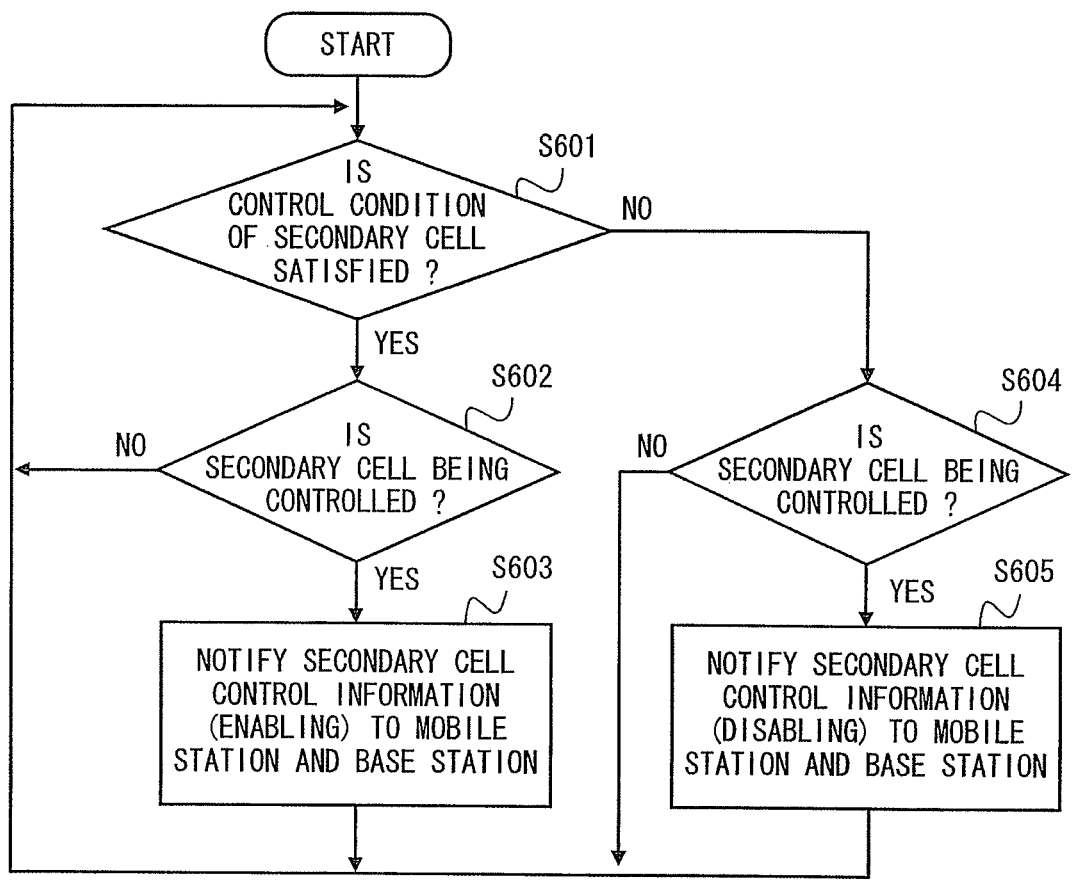
FIG. 10 is a flowchart relating to a change method of secondary cell control performed by a base station control apparatus according to fourth exemplary embodiment of the present invention.

FIG. 10 is a flowchart relating to a change of secondary cell control performed by the base station control apparatus 30. In a step S601, the secondary cell control unit 35 determined whether the execution condition of the secondary cell control is satisfied or not based on the load state of the secondary cell, the transmission power of the mobile station 20, or the like. In other words, the secondary cell control unit 35 determines the necessity/non-necessity of the entire secondary cell control or any of the detailed control items included therein. When the execution condition of the secondary cell control is not satisfied (No at S601), the secondary cell control unit 35 determines whether the secondary cell control has been enabled at that moment or not (whether the secondary cell control is being performed or not) (step S604). When the secondary cell control has been enabled (Yes at S604), the secondary cell control unit 35 notifies secondary cell control information used to disable the secondary cell control to the base station 10 and the mobile station 20 (S605). When the secondary cell control has been disabled (No at S604), there is no need to change the secondary cell control and therefore the process returns to the step S601.

When the execution condition of the secondary cell control is satisfied (Yes at S601) in the step S601, the secondary cell control unit 35 determines whether the secondary cell control has been enabled at that moment or not (step S602). When the secondary cell control has been enabled (Yes at S602), there is no need to change the secondary cell control and therefore the process returns to the step S601. When the secondary cell control has been disabled (No at S602), the secondary cell control unit 35 notifies secondary cell control information used to enable the secondary cell control to the base station 10 and the mobile station 20.

Note that for the secondary cell setting information notified from the base station control apparatus 30 to the base station 10 and the mobile station 20 in this exemplary embodiment, any one of specific examples shown in FIGS. 17 to 22, which are shown as modified examples of Radio Bearer Reconfiguration and NBAP message, may be used.

Figure 11:
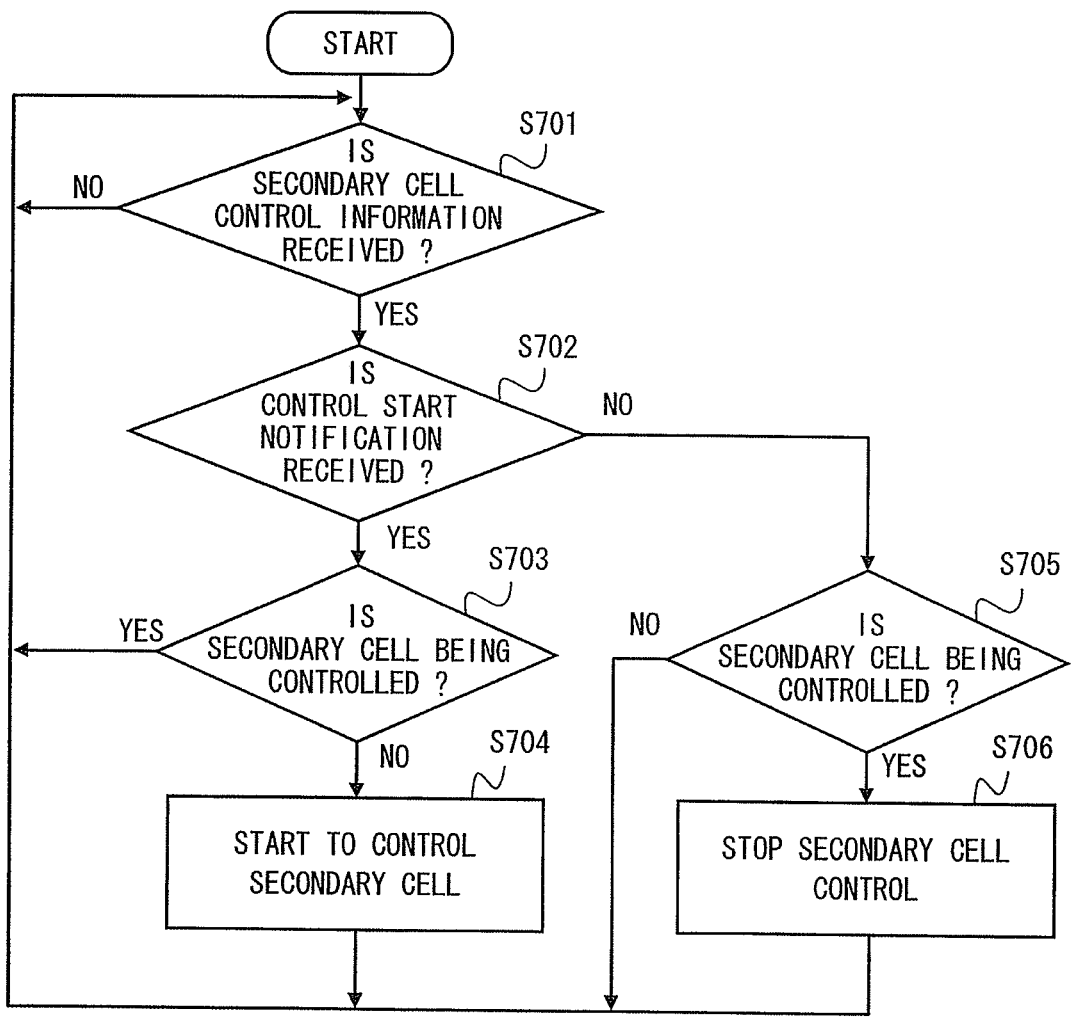
FIG. 11 is a flowchart relating to a change method of secondary cell control performed by a mobile station according to fourth exemplary embodiment of the present invention.

FIG. 11 is a flowchart relating to a change of secondary cell control performed by the mobile station 20. In a step S701, the secondary cell control unit 24 determines whether secondary cell control information is received or not. When the secondary cell setting information is not received (No at S701), the secondary cell control unit 24 repeats the determination process in the step S701. When the secondary cell setting information is received (Yes at S701), the secondary cell control unit 24 determines whether the secondary cell control information indicates enabling or not, i.e., whether the secondary cell control information indicates to start secondary cell control or not (step S702). When the control information indicates enabling (Yes at S702), the secondary cell control unit 24 determines whether the secondary cell control has been enabled at that moment or not, i.e., whether the secondary cell control is being performed or not (step S703). When the secondary cell control has already been enabled (Yes at step S703), there is no need to change the control and therefore the process returns to the step S701. When the secondary cell control has been disabled (No at step S703), the secondary cell control unit 24 enables secondary cell control performed by the reception data processing unit 22 and the transmission data processing unit 25 (step S704) and retunes to the step S701.

On the other hand, when the secondary cell control information indicates disabling in the step S702, the secondary cell control unit 24 determines whether the secondary cell control has been enabled at that moment or not, i.e., whether the secondary cell control is being performed or not (step S705). When the secondary cell control has been enabled (Yes at step S705), the secondary cell control unit 24 stops the secondary cell control performed by the reception data processing unit 22 and the transmission data processing unit 25 (step S706). When the secondary cell control has already been disabled (No at step S705), there is no need to change the control and therefore the process returns to the step S701.

Figure 12:
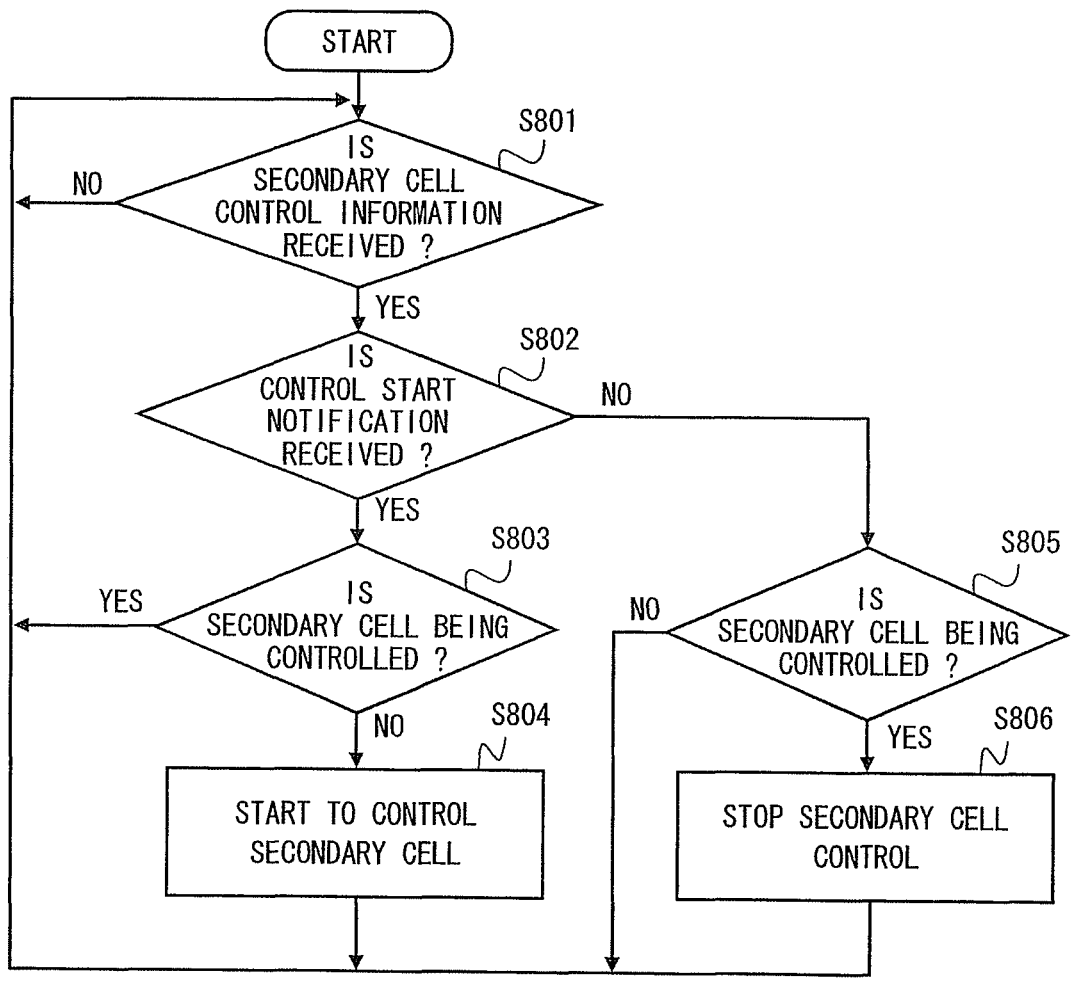
FIG. 12 is a flowchart relating to a change method of secondary cell control performed by a base station according to fourth exemplary embodiment of the present invention.

FIG. 12 is a flowchart relating to a change of secondary cell control performed by the base station 10. In a step S801, the secondary cell control unit 15 determines whether secondary cell control information is received or not. When the secondary cell control information is not received (No at S801), the secondary cell control unit 15 repeats the determination process in the step S801. When the secondary cell control information is received (Yes at S801), the secondary cell control unit 15 determines whether the secondary cell control information indicates enabling or not, i.e., whether the secondary cell control information indicates to start secondary cell control or not (step S802). When the control information indicates enabling (Yes at S802), the secondary cell control unit 15 determines whether the secondary cell control has been enabled at that moment or not, i.e., whether the secondary cell control is being performed or not (step S803). When the secondary cell control has already been enabled (Yes at step S803), there is no need to change the control and therefore the process returns to the step S801. When the secondary cell control has been disabled (No at step S803), the secondary cell control unit 15 enables the secondary cell control performed by the reception data processing unit 13 and the transmission data processing unit 12 (step S804) and retunes to the step S701.

On the other hand, when the secondary cell control information indicates disabling in the step S802, the secondary cell control unit 15 determines whether the secondary cell control has been enabled at that moment or not, i.e., whether the secondary cell control is being performed or not (step S805). When the secondary cell control has been enabled (Yes at step S805), the secondary cell control unit 15 stops the secondary cell control performed by the reception data processing unit 13 and the transmission data processing unit 12 (step S806). When the secondary cell control has already been disabled (No at step S805), there is no need to change the control and therefore the process returns to the step S701.

As described above, the base station 10 and the mobile station 20 according to this exemplary embodiment can change the secondary cell control under instructions of the secondary cell control information from the base station control apparatus 30 while the secondary cell is in operation. Therefore, according to this exemplary embodiment, it is possible to cope with the two problems, which are in a trade-off relation (contradictory relation) between the deterioration of the use efficiency of the radio resources and the deterioration of the radio quality of the secondary cell, in a system such as an MC-HSPA system in which both a combination of carrier frequency bands that are away from each other and a combination of carrier frequency bands that are adjacent to each other can be alternatively used as the combination of carrier frequency bands for the primary cell and the secondary cell, in a flexible manner according to the change in the operation state.

Fifth Exemplary Embodiment

In the first to fourth exemplary embodiments, examples in which the base station control apparatus 30 determines the enabling/disabling of secondary cell control are shown. In the fifth exemplary embodiment, an example in which either the base station 10 or the mobile station 20, or both of them determine the enabling/disabling of secondary cell control is explained.

Figure 13:
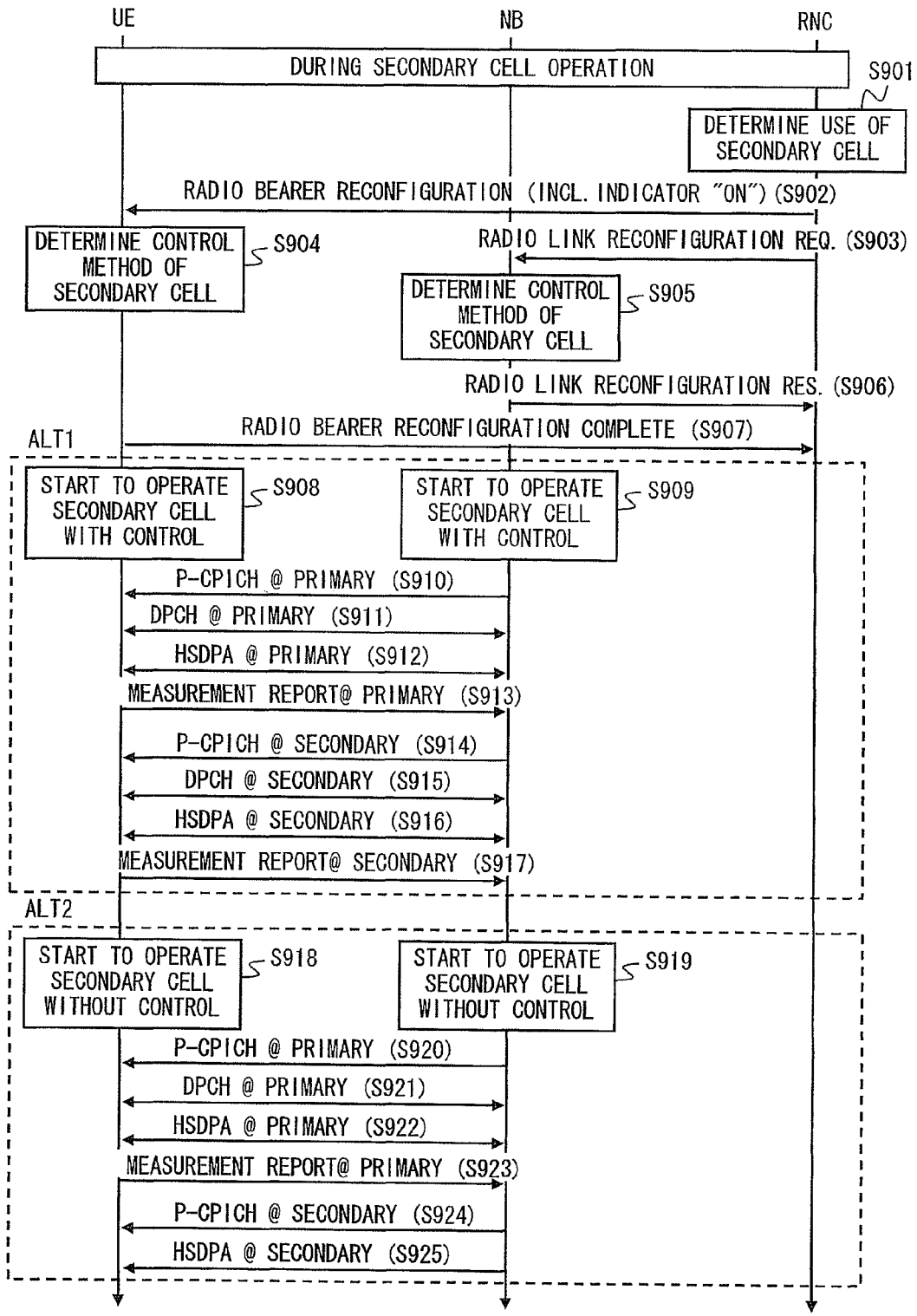
FIG. 13 is a sequence diagram showing an example of a procedure for changing secondary cell control.

A specific example of a procedure for changing a secondary cell control method is explained with reference to FIGS. 13 to 16. FIG. 13 is a sequence diagram showing an example of a procedure for establishing a secondary cell during operation. In a step S901, the base station control apparatus 30 determines whether a secondary cell should be used or not based on the load state of the radio resources, the transmission data amount, or the like. When the secondary cell should be used, the base station control apparatus 30 notifies the mobile station 20 of secondary cell setting information by using "Radio Bearer Reconfiguration", which is an RRC message (S902). Further, the base station control apparatus 30 also notifies the base station 10 of the secondary cell setting information by using "Radio Link Reconfiguration Request", which is an NBAP message (S903). Note that since the necessity/non-necessity of the secondary cell control is determined in the base station 10 and the mobile station 20 in this exemplary embodiment, the secondary cell setting information transmitted by the base station control apparatus 30 does not necessarily include the secondary cell control information.

The mobile station 20 confirms the secondary cell setting information notified from the base station control apparatus 30 (S904), and transmits a confirmation completion notification to the base station control apparatus 30 by using "Radio Bearer Reconfiguration Complete" (step S907). Further, the base station 10 confirms the secondary cell setting information notified from the base station control apparatus 30 (S905), and transmits a confirmation completion notification to the base station control apparatus 30 by using "Radio Link Reconfiguration Response" (step S906).

Further, in the steps S904 and S905, the mobile station 20 and the base station 10 calculates a frequency distance between the carrier frequency band of the primary cell and the carrier frequency band of the secondary cell. When the frequency distance is greater than a predetermined threshold, the mobile station 20 and the base station 10 enable the secondary cell control, whereas when the frequency distance is smaller than the threshold, the mobile station 20 and the base station 10 disable the secondary cell control. The predetermined threshold, which is used for determination of the frequency distance, may be generated by the mobile station 20 and the base station 10, stored in advance in the mobile station 20 and the base station 10, or notified (transmitted) from the base station control apparatus 30 to the mobile station 20 and the base station 10. Further, the determination of the necessity/non-necessity of secondary cell control using a calculation result of the frequency distance may be carried out by either the base station 10 or the mobile station 20. In this case, the apparatus that has determined the necessity/non-necessity of secondary cell control may notify the determination result or the items to be controlled (enabling or disabling of control) according to the determination result to the other apparatus.

Steps S908 to S925 are similar to the steps S108 to S125 of the first exemplary embodiment, and therefore their explanation is omitted.

Figure 14:
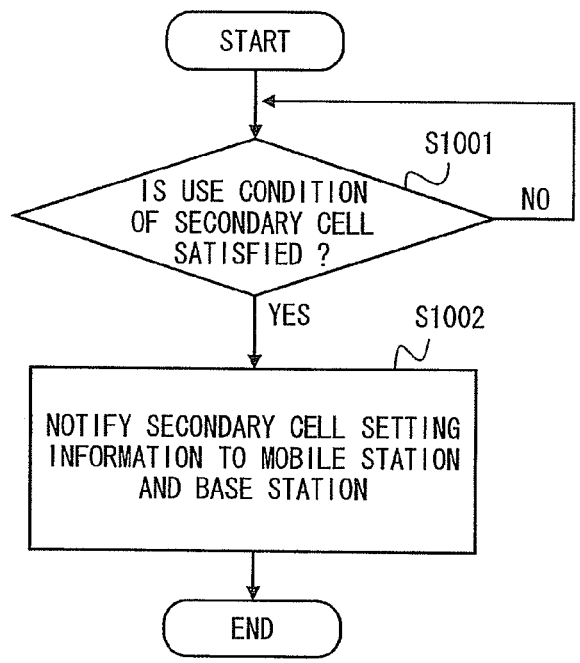
FIG. 14 is a flowchart relating to a change method of secondary cell control performed by a base station control apparatus according to fifth exemplary embodiment of the present invention.

FIG. 14 is a flowchart relating to a change of secondary cell control performed by the base station control apparatus 30. In a step S1001, the secondary cell control unit 35 determines whether the use condition of the secondary cell is satisfied or not based on the load state of the radio resources, the transmission data amount, or the like. When the use condition is not satisfied (No at S1001), the secondary cell control unit 35 repeats the determination process in the step S1001. When the use condition is satisfied (Yes at S1001), the secondary cell control unit 35 notifies secondary cell setting information to the base station 10 and the mobile station 20 (step S1002).

Figure 15:
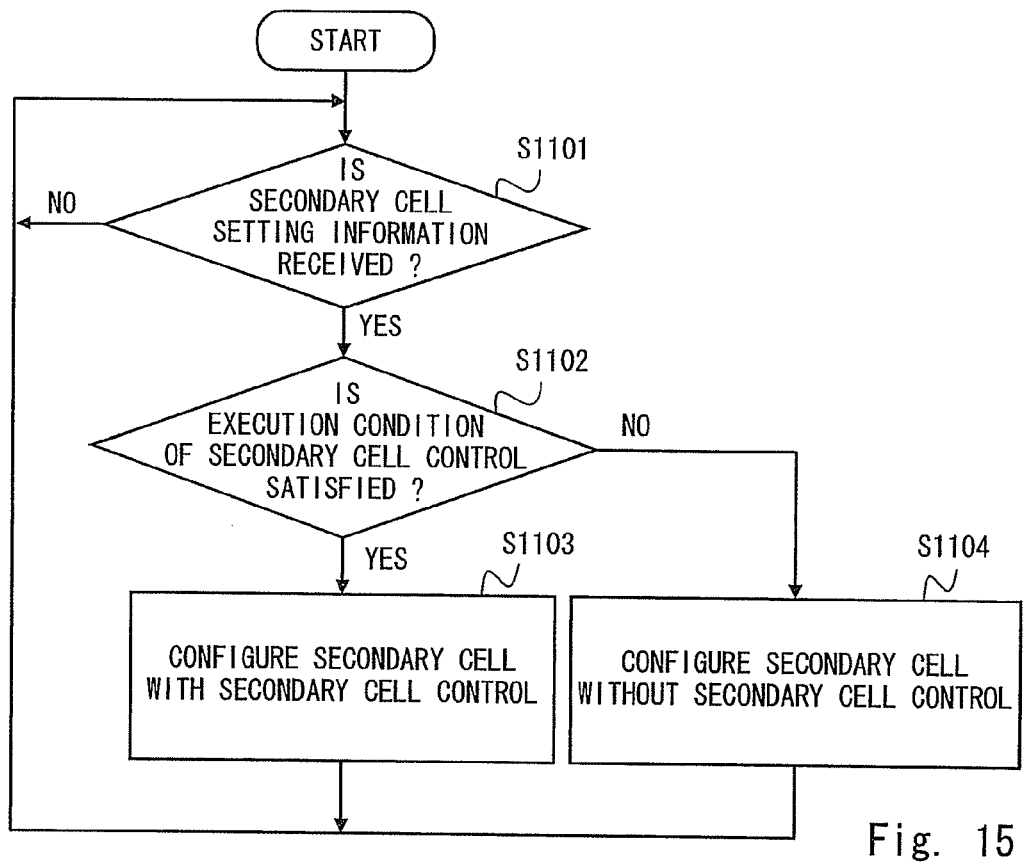
FIG. 15 is a flowchart relating to a change method of secondary cell control performed by a mobile station according to fifth exemplary embodiment of the present invention.

FIG. 15 shows a flowchart relating to a change of secondary cell control performed by the mobile station 20. In a step S1101, the secondary cell control unit 24 determines whether secondary cell setting information is received or not. When the secondary cell setting information is not received (No at S1101), the secondary cell control unit 24 repeats the determination process in the step S1101. When the secondary cell setting information is received (Yes at S1101), the secondary cell control unit 24 determines the necessity/non-necessity of secondary cell control, i.e., whether the execution condition of the secondary cell control is satisfied or not (step S1102). When the execution condition of the secondary cell control is satisfied (Yes at S1102), the secondary cell control unit 24 configures a secondary cell while enabling secondary cell control based on the secondary cell setting information notified from the base station control apparatus 30 (step S1103).

On the other hand, when the execution condition of the secondary cell control is not satisfied (No at S1102), the secondary cell control unit 24 configures a secondary cell while disabling the secondary cell control based on the secondary cell setting information notified from the base station control apparatus 30 (step S1104).

Figure 16:
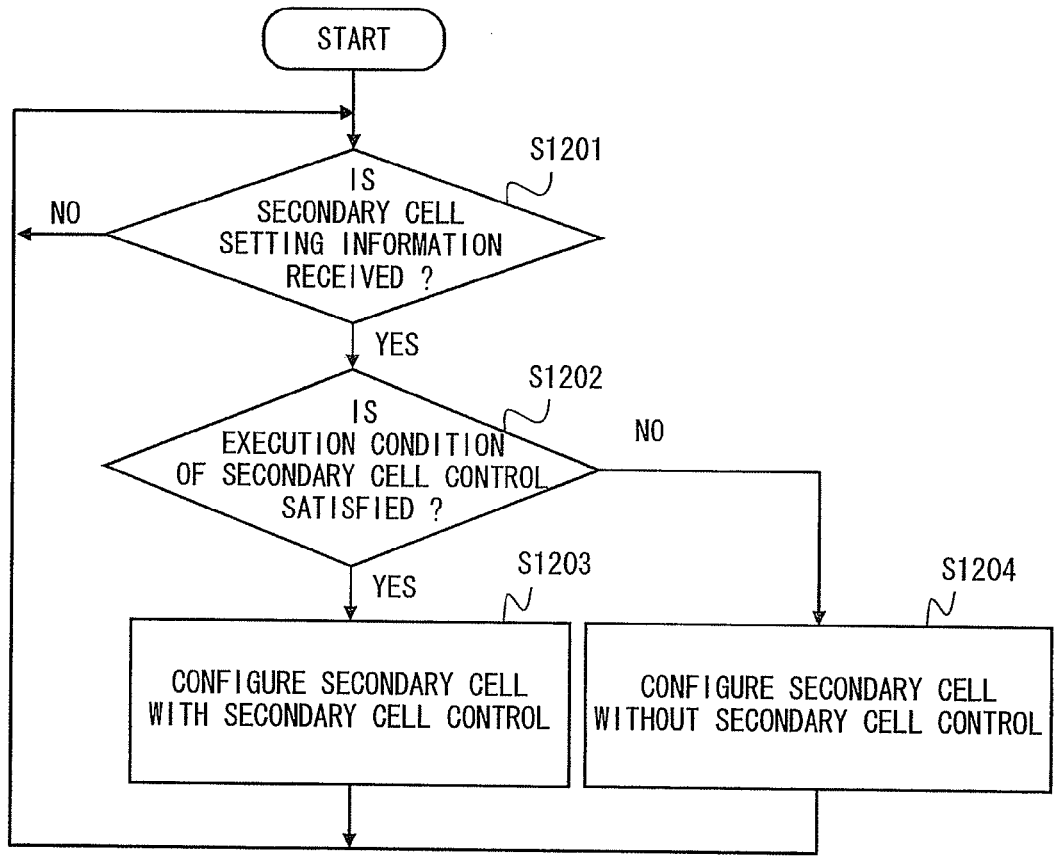
FIG. 16 is a flowchart relating to a change method of secondary cell control performed by a base station according to fifth exemplary embodiment of the present invention.
Figure 23:
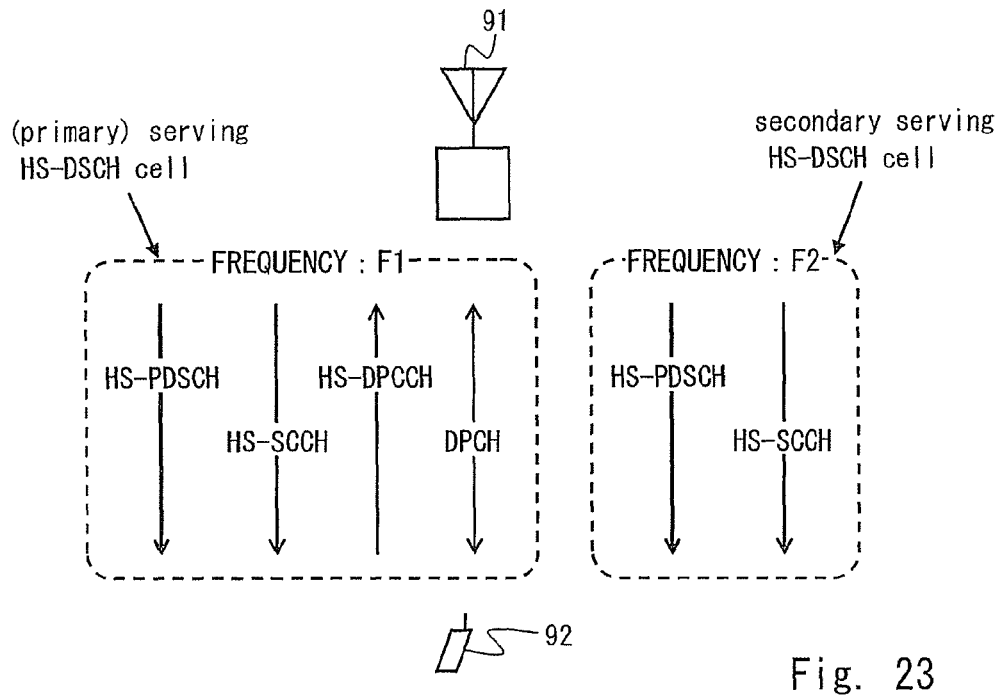
FIG. 23 is a physical channel configuration diagram used for packet communication performed according to DC-HSDPA.
Figure 24:
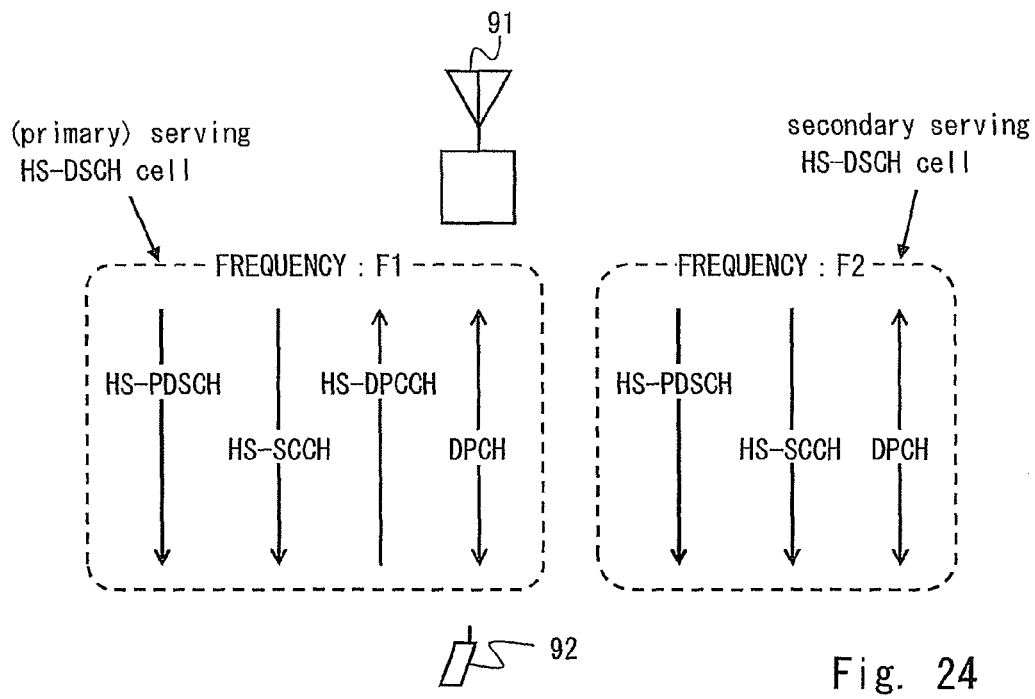
FIG. 24 is a physical channel configuration diagram used for packet communication performed according to MC-HSDPA.

FIG. 16 shows a flowchart relating to a change of secondary cell control performed by the base station 10. In a step S1201, the secondary cell control unit 15 determines whether secondary cell setting information is received or not. When the secondary cell setting information is not received (No at S1201), the secondary cell control unit 15 repeats the determination process in the step S1201. When the secondary cell setting information is received (Yes at S1201), the secondary cell control unit 15 determines the necessity/non-necessity of secondary cell control, i.e., whether the execution condition of the secondary cell control is satisfied or not (step S1202). When the execution condition of the secondary cell control is satisfied (Yes at S1202), the secondary cell control unit 15 configures a secondary cell while enabling the secondary cell control based on the secondary cell setting information notified from the base station control apparatus 30 (step S1203).

On the other hand, when the control condition is not satisfied (No at S1202), the secondary cell control unit 15 configures a secondary cell while disabling the secondary cell control based on the secondary cell setting information notified from the base station control apparatus 30 (step S1204).

As described above, the base station 10 and the mobile station 20 according to this exemplary embodiment can autonomously determine the necessity/non-necessity of the implementation of secondary cell control. Note that the determination of the necessity/non-necessity of the implementation of secondary cell control may be collectively made for the entire secondary cell control, or the start/stop (enabling/disabling) may be determined individually for each detailed control item included in the secondary cell control. Examples of the detailed control items include the implementation/non-implementation of transmission power control, the implementation/non-implementation of measurement information reporting, and the implementation/non-implementation of uplink channel transmission. Therefore, according to this exemplary embodiment, the base station 10 and the mobile station 20 can autonomously cope with the two problems, which are in a trade-off relation (contradictory relation) between the deterioration of the use efficiency of the radio resources and the deterioration of the radio quality of the secondary cell, in a system such as an MC-HSPA system in which both a combination of carrier frequency bands that are away from each other and a combination of carrier frequency bands that are adjacent to each other can be alternatively used as the combination of carrier frequency bands for the primary cell and the secondary cell.

Other Exemplary Embodiments

In the above-described first to fifth exemplary embodiments, examples in which the necessity/non-necessity of secondary cell control is determined based on the frequency distance between the carrier frequency band of the primary cell and the carrier frequency band of the secondary cell. However, the necessity/non-necessity of secondary cell control may be determined based on other conditions. For example, the start of secondary cell control may be determined in response to the increase in the usage amount or the usage ratio of the radio resources of frequencies to be used for the secondary cell over a predetermined threshold. Further, the start of secondary cell control may be determined in response to the increase in the uplink transmission power of a mobile station 20 connected to the secondary cell over a predetermined threshold. Note that when the determination based on the radio resource usage ratio or the determination based on the uplink transmission power of a mobile station 20 is made in either the mobile station 20 or the base station 10, or both of them, the threshold used for the determination may be notified (transmitted) from the base station control apparatus 30 to the mobile station 20 or the base station 10. Further, it is also possible to adopt such an operation form that the base station 10 or the mobile station 20 measures the throughput or the load and requests the base station control apparatus 30 to perform secondary cell control based on the measurement result.

Although "Radio Bearer Reconfiguration" (RRC message) and "Radio Link Reconfiguration Request" (NBAP message) are used as messages that are used to notify secondary cell control information in the above-described first to fifth exemplary embodiments, other messages shown below as examples may be also used as substitutes for them.

[RRC Message]
TRANSPORT CHANNEL RECONFIGURATION
RRC CONNECTION SETUP
RADIO BEARER SETUP
RADIO BEARER RECONFIGURATION
PHYSICAL CHANNEL RECONFIGURATION
CELL UPDATE CONFIRM
ACTIVE SET UPDATE

[NBAP Message]
RADIO LINK SETUP REQUEST
RADIO LINK ADDITION REQUEST
RADIO LINK PARAMETER UPDATE INDICATION The above-described first to fifth exemplary embodiments are explained on the assumption that each of the base station 10 forms only one secondary cell. However, the base station 10 may form more than one secondary cell. The only requirement for the base station 10 is that it can form at least one secondary cell and change at least one secondary cell control item relating to at least one secondary cell.

In the above-described first to fifth exemplary embodiments, the present invention is applied to a base station that supports MC-HSDPA adopting W-CDMA scheme. However, the application of the present invention is not limited to base stations that support MC-HSDPA adopting W-CDMA scheme. That is, the present invention can be applied to any base stations that use at least two cells using different frequency channels (carrier frequency bands) and communicate with a mobile station by transmitting a physical channel for data transmission in each of the two cells regardless of whether their multi-access scheme for the downlink channel is CDMA or not. In the case of the above-described MC-HSDPA adopting W-CDMA scheme, each physical channel for data transmission is identified based on the difference of orthogonal code (channelization code). In contrast to this, in the case of base stations in which OFDMA (Orthogonal Frequency Division Multiplexing Access) is used for the multiple access scheme for the downlink channel like WiMAX and LTE, each physical channel for data transmission is identified based on the difference of tone (subcarrier).

The operations relating to the change of the secondary cell control condition performed in the base station control apparatus, the base station, and the mobile station described above in the first to fifth exemplary embodiments may be implemented by using an ASIC (Application Specific Integrated Circuit), a DSP (Digital Signal Processor), an MPU (Micro Processing Unit) or a CPU (Central Processing Unit), or a computer-system including a combination thereof. Specifically, they may be implemented by making a computer-system execute a program including a group of instructions relating to a processing operation of each of the apparatuses explained above with reference to the sequence diagrams and the flowcharts. This program can be stored in various types of storage media, and/or can be transmitted through communication media. Note that examples of the storage media include a flexible disk, a hard disk, a magnetic disk, magneto-optic disk, a CD-ROM, a DVD, a ROM cartridge, a RAM memory cartridge with a battery backup, a flash memory cartridge, and a nonvolatile RAM cartridge. Further, examples of the communication media include a wire communication medium such as a telephone line, a radio communication medium such as a microwave line, and the Internet.

Further, the first to fifth exemplary embodiments of the invention can be combined as appropriate. Further, the present invention is not limited to the above-described exemplary embodiments, and needless to say, various modifications can be made without departing from the above-described spirit of the present invention.

This application is based upon and claims the benefit of priority from Japanese patent application No. 2009-060559, filed on Mar. 13, 2009, the disclosure of which is incorporated herein in its entirety by reference.

REFERENCE SIGNS LIST

10 BASE STATION
20 MOBILE STATION
30 BASE STATION CONTROL APPARATUS
11 RADIO COMMUNICATION UNIT
12 TRANSMISSION DATA PROCESSING UNIT
13 RECEPTION DATA PROCESSING UNIT
14 COMMUNICATION UNIT
15 Secondary Cell Control Unit
21 RADIO COMMUNICATION UNIT
22 RECEPTION DATA PROCESSING UNIT
23 TRANSMISSION DATA CONTROL UNIT
24 SECONDARY CELL CONTROL UNIT
25 TRANSMISSION DATA PROCESSING UNIT
26 BUFFER UNIT
32 TRANSMISSION DATA PROCESSING UNIT
33 RECEPTION DATA PROCESSING UNIT
34 COMMUNICATION UNIT
35 SECONDARY CELL CONTROL UNIT
80 CORE NETWORK

The invention claimed is:

1. A radio communication system comprising:
a mobile station; and
a base station configured to perform radio communication with the mobile station by using first and second carrier frequency bands simultaneously in at least one of an uplink direction and a downlink direction,
wherein the mobile station and the base station are configured to be able to switch whether or not to perform control relating to the second carrier frequency band using a second radio channel transmitted on the second carrier frequency band,
wherein the mobile station and the base station perform the control relating to the second carrier frequency band by using the second radio channel transmitted on the second carrier frequency band when a frequency distance between the first carrier frequency band and the second carrier frequency band is larger than a predetermined threshold, and
instead of using the second radio channel transmitted on the second carrier frequency band, the mobile station and the base station perform the control relating to the second carrier frequency band by use of results of control relating to the first carrier frequency band using a first radio channel transmitted on the first carrier frequency band when the frequency distance is not larger than the predetermined threshold.

2. The radio communication system according to claim 1, wherein the mobile station and the base station are configured to be able to switch between performing the control relating to the second carrier frequency band in association with control relating to the first carrier frequency band by using a first radio channel transmitted on the first carrier frequency band and performing the control relating to the second carrier frequency band independently from the control relating to the first carrier frequency band by using a second radio channel transmitted on the second carrier frequency band.

3. The radio communication system according to claim 1, wherein the mobile station and the base station switch whether or not to perform the control by using the radio channel transmitted on the second carrier frequency band according to a usage amount of radio resources in the second carrier frequency band.

4. The radio communication system according to claim 1, wherein the mobile station and the base station switch whether or not to perform the control by using the radio channel transmitted on the second carrier frequency band according to magnitude of uplink transmission power of the mobile station.

5. The radio communication system according to claim 3, wherein the mobile station and the base station perform the control by using the radio channel transmitted on the second carrier frequency band when the radio resource usage amount is larger than a predetermined threshold.

6. The radio communication system according to claim 4, wherein the mobile station and the base station perform the control by using the radio channel transmitted on the second carrier frequency band when the uplink transmission power is larger than a predetermined threshold.

7. The radio communication system according to claim 1, further comprising a base station control apparatus that performs communication control between the base station and the mobile station,
wherein the mobile station switches whether or not to perform the control by using the radio channel transmitted on the second carrier frequency band according to control information transmitted from the base station or the base station control apparatus.

8. The radio communication system according to claim 7, wherein
the control relating to the second carrier frequency band comprises a plurality of detailed controls,
the control information comprises at least one information element, and the at least one information element is associated with at least two of the plurality of detailed controls, and
the mobile station determines switching of the at least two detailed controls according to a reception result of the at least one information element.

9. The radio communication system according to claim 7, wherein
the control relating to the second carrier frequency band comprises a plurality of detailed controls,
the control information comprises a plurality of information elements, each of the information elements being associated with a respective one of the plurality of detailed controls, and
the mobile station determines switching of each of the plurality of detailed controls according to a reception result of the plurality of information elements.

10. The radio communication system according to claim 1, wherein the mobile station autonomously determines whether or not to perform the control by using the radio channel transmitted on the second carrier frequency band.

11. The radio communication system according to claim 1, further comprising a base station control apparatus that performs communication control between the base station and the mobile station, wherein the mobile station receives the threshold from the base station or the base station control apparatus, and determines switching of the control relating to the second carrier frequency band by using the received threshold.

12. The radio communication system according to claim 1, wherein
the control relating to the second carrier frequency band comprises (a) a reconfiguration of a uplink radio channel group transmitted from the mobile station to the base station by using the second carrier frequency band, (b) reporting of a measurement result relating to the second carrier frequency band from the mobile station to the base station, and (c) transmission power control relating to the second carrier frequency band, and
the base station and the mobile station selectively perform a part of the controls (a) to (c).

13. The radio communication system according to claim 1, wherein
the control relating to the second carrier frequency band comprises at least one of (i) a reconfiguration of a uplink radio channel group transmitted from the mobile station to the base station, (ii) measurement of communication quality of a downlink radio channel transmitted from the base station to the mobile station, and (iii) downlink transmission power control of the base station.

14. The radio communication system according to claim 2, wherein when the first radio channel is used, control information transferred by using the first radio channel is used for both the control relating to the second carrier frequency band and its corresponding control relating to the first carrier frequency band.

15. The radio communication system according to claim 2, wherein when the control relating to the second carrier frequency band is performed by using the first radio channel, measurement information relating to the first carrier frequency band is used for the control relating to the second carrier frequency band.

16. The radio communication system according to claim 1, wherein radio communication using the second carrier frequency band is performed dependently and additionally on condition that radio communication using the first carrier frequency band is already being performed.

17. A base station comprising:
radio communication unit capable of performing radio communication with a mobile station by using first and second carrier frequency bands simultaneously for at least one of an uplink direction and a downlink direction; and
control unit capable of switching whether or not to perform control relating to the second carrier frequency band using a second radio channel transmitted on the second carrier frequency band,
wherein the control unit performs the control relating to the second carrier frequency band by using the second radio channel transmitted on the second carrier frequency band when a frequency distance between the first carrier frequency band and the second carrier frequency band is larger than a predetermined threshold, and
instead of using the second radio channel transmitted on the second carrier frequency band, the control unit performs the control relating to the second carrier frequency band by use of results of control relating to the first carrier frequency band using a first radio channel transmitted on the first carrier frequency band when the frequency distance is not larger than the predetermined threshold.

18. The base station according to claim 17, wherein the control unit is configured to be capable of switching between performing the control relating to the second carrier frequency band in association with control relating to the first carrier frequency band by using a first radio channel transmitted on the first carrier frequency band and performing the control relating to the second carrier frequency band by using a second radio channel transmitted on the second carrier frequency band.

19. The base station according to claim 17, wherein the control unit switches whether or not to perform the control by using the radio channel transmitted on the second carrier frequency band according to a usage amount of radio resources of the second carrier frequency band.

20. The base station according to claim 17, wherein the control unit switches whether or not to perform the control by using the radio channel transmitted on the second carrier frequency band according to magnitude of uplink transmission power of the mobile station.

21. The base station according to claim 17, wherein the control unit switches whether or not to perform the control by using the radio channel transmitted on the second carrier frequency band under an instruction from a base station control apparatus that performs communication control between the base station and the mobile station.

22. The base station according to claim 17, wherein the control unit autonomously determines whether or not to perform the control by using the radio channel transmitted on the second carrier frequency band.

23. The base station according to claim 17, wherein
the control relating to the second carrier frequency band comprises (a) a reconfiguration of a uplink radio channel group transmitted from the mobile station to the base station by using the second carrier frequency band, (b) reporting of a measurement result relating to the second carrier frequency band from the mobile station to the base station, and (c) transmission power control relating to the second carrier frequency band, and the base station and the mobile station selectively perform a part of the controls (a) to (c).

24. The base station according to claim 17, wherein
the control relating to the second carrier frequency band comprises at least one of (i) a reconfiguration of a uplink radio channel group transmitted from the mobile station to the base station, (ii) measurement of communication quality of a downlink radio channel transmitted from the base station to the mobile station, and (iii) downlink transmission power control of the base station.

25. A mobile station comprising:
radio communication unit capable of performing radio communication with a base station by using first and second carrier frequency bands simultaneously for at least one of an uplink direction and a downlink direction; and
control unit capable of switching whether or not to perform control relating to the second carrier frequency band using a second radio channel transmitted on the second carrier frequency band,
wherein the control unit performs the control relating to the second carrier frequency band by using the second radio channel transmitted on the second carrier frequency band when a frequency distance between the first carrier frequency band and the second carrier frequency band is larger than a predetermined threshold, and
instead of using the second radio channel transmitted on the second carrier frequency band, the control unit performs the control relating to the second carrier frequency band by use of results of control relating to the first carrier frequency band using a first radio channel transmitted on the first carrier frequency band when the frequency distance is not larger than the predetermined threshold.

26. The mobile station according to claim 25, wherein the control unit is configured to be capable of switching between performing the control relating to the second carrier frequency band in association with control relating to the first carrier frequency band by using a first radio channel transmitted on the first carrier frequency band and performing the control relating to the second carrier frequency band by using a second radio channel transmitted on the second carrier frequency band.

27. The mobile station according to claim 25, wherein the control unit switches whether or not to perform the control by using the radio channel transmitted on the second carrier frequency band according to a usage amount of radio resources of the second carrier frequency band.

28. The mobile station according to claim 25, wherein the control unit switches whether or not to perform the control by using the radio channel transmitted on the second carrier frequency band according to magnitude of uplink transmission power of the mobile station.

29. The mobile station according to claim 25, wherein the control unit switches whether or not to perform the control by using the radio channel transmitted on the second carrier frequency band under an instruction from the base station or a base station control apparatus that performs communication control between the base station and the mobile station.

30. The mobile station according to claim 25, wherein the control unit autonomously determines whether or not to perform the control by using the radio channel transmitted on the second carrier frequency band.

31. The mobile station according to claim 25, wherein
the control relating to the second carrier frequency band comprises (a) a reconfiguration of a uplink radio channel group transmitted from the mobile station to the base station by using the second carrier frequency band, (b) reporting of a measurement result relating to the second carrier frequency band from the mobile station to the base station, and (c) transmission power control relating to the second carrier frequency band, and the base station and the mobile station selectively perform a part of the controls (a) to (c).

32. A control method of a base station capable of performing radio communication with a mobile station by using first and second carrier frequency bands simultaneously for at least one of an uplink direction and a downlink direction, the method comprising:
switching whether or not to perform control relating to the second carrier frequency band using a second radio channel transmitted on the second carrier frequency band,
wherein the switching includes performing the control relating to the second carrier frequency band by using the second radio channel transmitted on the second carrier frequency band when a frequency distance between the first carrier frequency band and the second carrier frequency band is larger than a predetermined threshold, and
the switching includes, instead of using the second radio channel transmitted on the second carrier frequency band, performing the control relating to the second carrier frequency band by use of results of control relating to the first carrier frequency band using a first radio channel transmitted on the first carrier frequency band when the frequency distance is not larger than the predetermined threshold.

33. The method according to claim 32, whether the control relating to the second carrier frequency band is switched between (a) a control mode in which the control relating to the second carrier frequency band is performed in association with control relating to the first carrier frequency band by using a first radio channel transmitted on the first carrier frequency band and (b) another control mode in which the control relating to the first carrier frequency band and the control relating to the second carrier frequency band are performed independently of each other by using a second radio channel transmitted on the second carrier frequency band.

34. A control method of a mobile station capable of performing radio communication with a base station by using first and second carrier frequency bands simultaneously for at least one of an uplink direction and a downlink direction, the method comprising:
switching whether or not to perform control relating to the second carrier frequency band using a second radio channel transmitted on the second carrier frequency band,
wherein the switching includes performing the control relating to the second carrier frequency band by using the second radio channel transmitted on the second carrier frequency band when a frequency distance between the first carrier frequency band and the second carrier frequency band is larger than a predetermined threshold, and
the switching includes, instead of using the second radio channel transmitted on the second carrier frequency band, performing the control relating to the second carrier frequency band by use of results of control relating to the first carrier frequency band using a first radio channel transmitted on the first carrier frequency band when the frequency distance is not larger than the predetermined threshold.

35. The method according to claim 34, whether the control relating to the second carrier frequency band is switched between (a) a control mode in which the control relating to the second carrier frequency band is performed in association with control relating to the first carrier frequency band by using a first radio channel transmitted on the first carrier frequency band and (b) another control mode in which the control relating to the first carrier frequency band and the control relating to the second carrier frequency band are performed independently of each other by using a second radio channel transmitted on the second carrier frequency band.

36. A non-transitory storage medium storing a program that causes a computer to execute processing relating to a base station capable of performing radio communication with a mobile station by using first and second carrier frequency bands simultaneously for at least one of an uplink direction and a downlink direction, wherein the processing comprising switching whether or not to perform control relating to the second carrier frequency band using a second radio channel transmitted on the second carrier frequency band, and the switching includes performing the control relating to the second carrier frequency band by using the second radio channel transmitted on the second carrier frequency band when a frequency distance between the first carrier frequency band and the second carrier frequency band is larger than a predetermined threshold, and the switching includes, instead of using the second radio channel transmitted on the second carrier frequency band, performing the control relating to the second carrier frequency band by use of results of control relating to the first carrier frequency band using a first radio channel transmitted on the first carrier frequency band when the frequency distance is not larger than the predetermined threshold.

37. A non-transitory storage medium storing a program that causes a computer to execute processing relating to a mobile station capable of performing radio communication with a base station by using first and second carrier frequency bands simultaneously for at least one of an uplink direction and a downlink direction, wherein the processing comprising switching whether or not to perform control relating to the second carrier frequency band using a second radio channel transmitted on the second carrier frequency band, and the switching includes performing the control relating to the second carrier frequency band by using the second radio channel transmitted on the second carrier frequency band when a frequency distance between the first carrier frequency band and the second carrier frequency band is larger than a predetermined threshold, and the switching includes, instead of using the second radio channel transmitted on the second carrier frequency band, performing the control relating to the second carrier frequency band by use of results of control relating to the first carrier frequency band using a first radio channel transmitted on the first carrier frequency band when the frequency distance is not larger than the predetermined threshold.

\* \* \* \* \*